(12) United States Patent
Ookawa et al.

(10) Patent No.: US 7,766,532 B2
(45) Date of Patent: Aug. 3, 2010

(54) LIGHT GUIDE FOR SURFACE LIGHT SOURCE DEVICE AND SURFACE LIGHT SOURCE DEVICE

(75) Inventors: Makoto Ookawa, Kanagawa (JP);
Yasushi Watanabe, Kanagawa (JP);
Yoshihito Nozaki, Kanagawa (JP);
Yoshiaki Murayama, Kanagwa (JP);
Hiroki Matsumoto, Kanagawa (JP);
Atsushi Saiki, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 185 days.

(21) Appl. No.: 11/988,684

(22) PCT Filed: Jul. 12, 2006

(86) PCT No.: PCT/JP2006/313889

§ 371 (c)(1),
(2), (4) Date: Feb. 11, 2008

(87) PCT Pub. No.: WO2007/007799

PCT Pub. Date: Jan. 18, 2007

(65) Prior Publication Data

US 2009/0034294 A1    Feb. 5, 2009

(30) Foreign Application Priority Data

Jul. 13, 2005  (JP) .............................. 2005-203891
Jan. 5, 2006   (JP) .............................. 2006-000550
Jan. 5, 2006   (JP) .............................. 2006-000552

(51) Int. Cl.
*F21V 7/04* (2006.01)
(52) U.S. Cl. ...................................... 362/615; 362/620
(58) Field of Classification Search ................. 362/600, 362/610, 615, 619, 620, 625, 626
See application file for complete search history.

(56) References Cited

U.S. PATENT DOCUMENTS

| 5,851,062 | A | 12/1998 | Shinohara et al. |
| 6,334,689 | B1 * | 1/2002 | Taniguchi et al. ............ 362/619 |
| 7,008,099 | B2 * | 3/2006 | Yamashita et al. ........... 362/620 |
| 7,354,184 | B2 * | 4/2008 | Parker ......................... 362/607 |
| 7,530,719 | B2 * | 5/2009 | Yamashita et al. ........... 362/600 |
| 2005/0237768 | A1 | 10/2005 | Matsumoto et al. |
| 2009/0034294 | A1 * | 2/2009 | Ookawa et al. .............. 362/620 |

FOREIGN PATENT DOCUMENTS

| JP | Y-40-26083 | 9/1965 |
| JP | U-60-60788 | 4/1985 |
| JP | U-62-154422 | 9/1987 |
| JP | U-6-16902 | 3/1994 |
| JP | 8-136733 | 5/1996 |
| JP | 8-227074 | 9/1996 |
| JP | 9-54555 | 2/1997 |
| JP | 10-153778 | 6/1998 |
| JP | 2002-169033 | 6/2002 |
| JP | 2002-216530 | 8/2002 |
| JP | 2002-258057 | 9/2002 |
| WO | WO-2004/016985 | 2/2004 |

* cited by examiner

*Primary Examiner*—Anabel M Ton
(74) *Attorney, Agent, or Firm*—Morgan, Lewis & Bockius LLP

(57) ABSTRACT

A light guide (3) for a surface light source used to constitute a surface light source in combination with a primary light source (1) and guiding light emitted from the primary light source (1). The light guide (3) has a light incident end face (31) on which the light emitted from the primary light source (1) impinges, a light exit face (33) from which guided light exits, and a rear surface (34) on the opposite side. A plurality of prism arrays (34a) extending in a direction traversing the light incident end face (31) are formed on at least one of the light exit face (33) and the rear surface (34), and each prism array (34a) has a plurality of divided top portions (34a1, 34a2) where the top is divided in the cross-section profile thereof in at least a partial region in the extending direction.

13 Claims, 27 Drawing Sheets

FIG.19
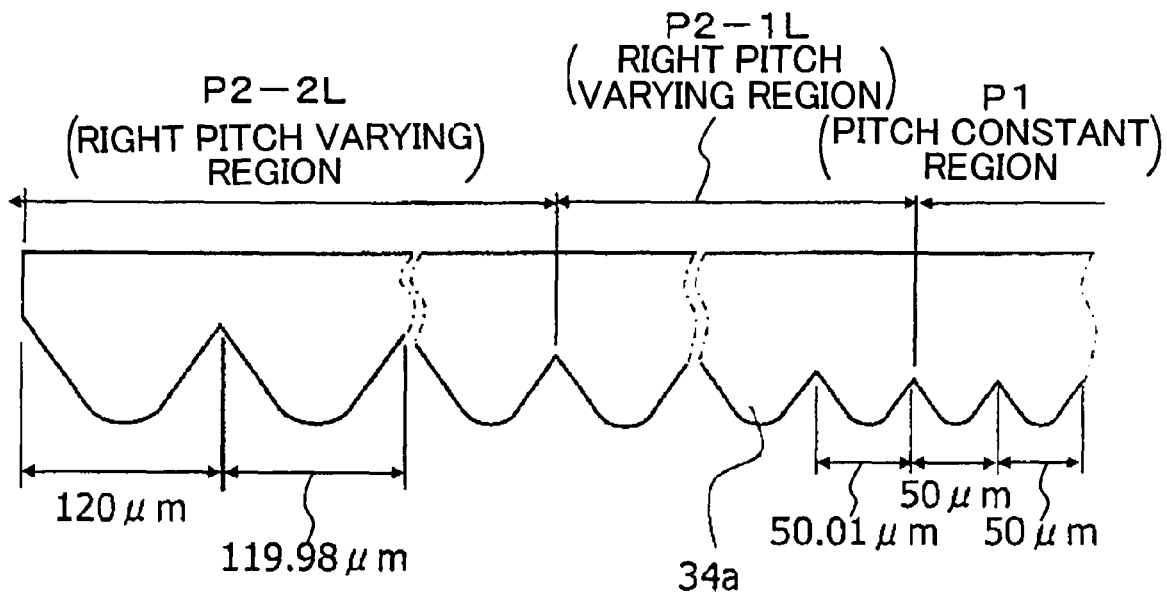
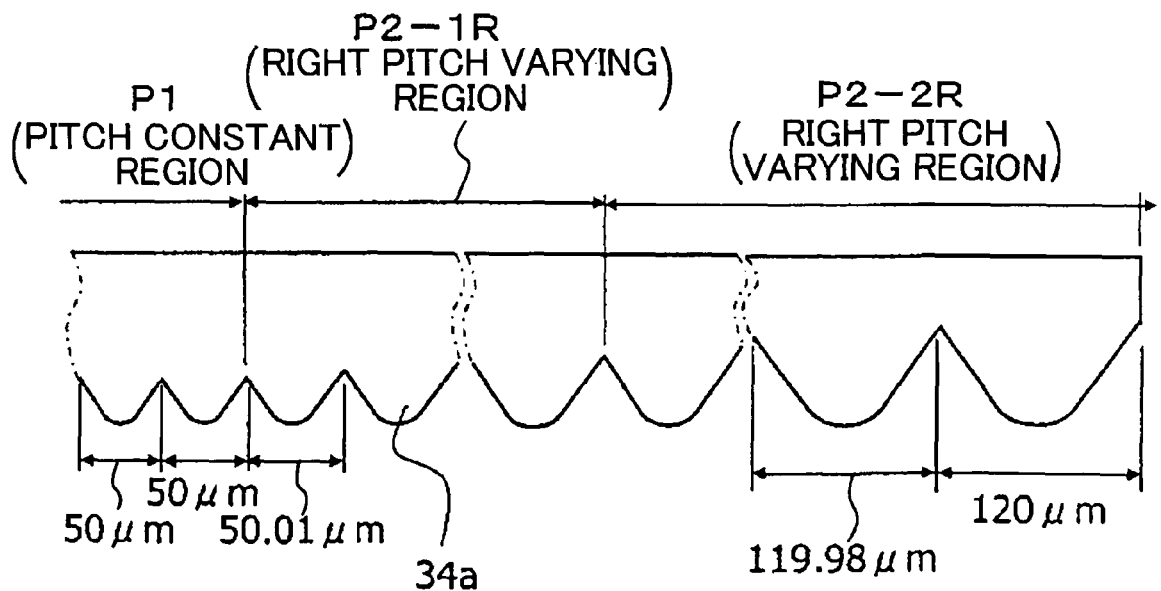

FIG.23
CC' CROSS SECTION
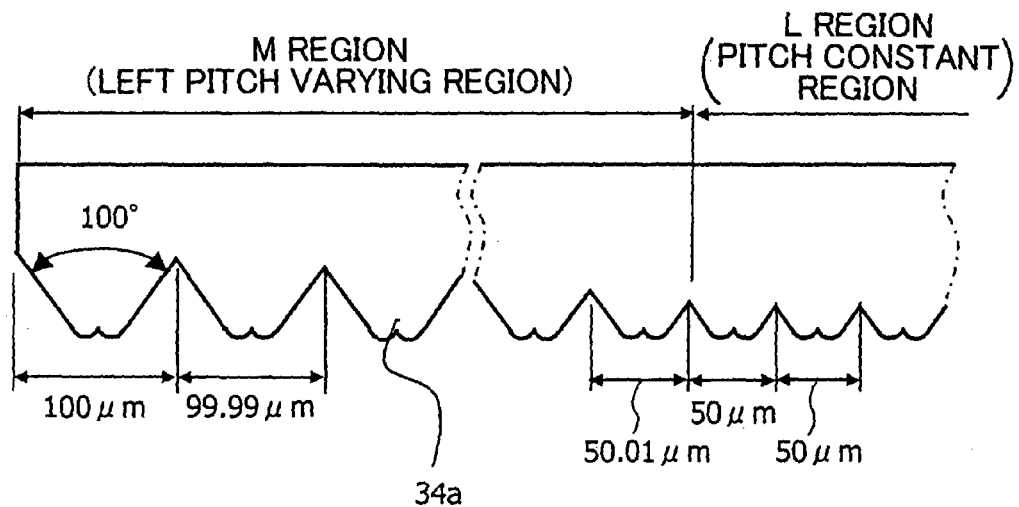
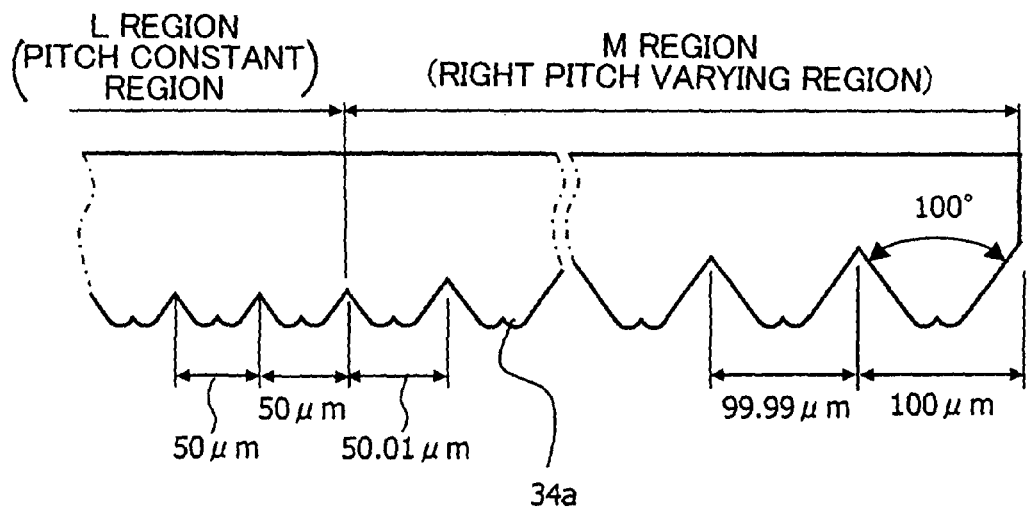

FIG.24
DD' CROSS SECTION
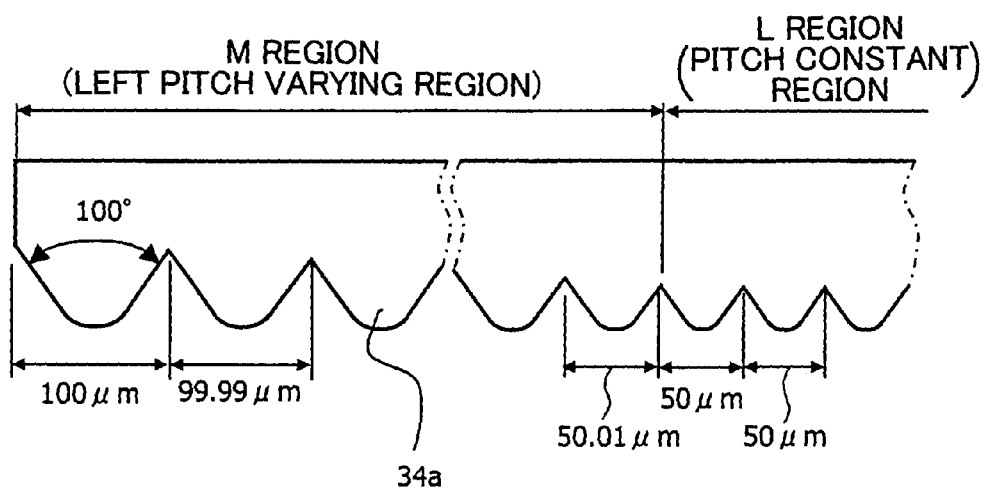
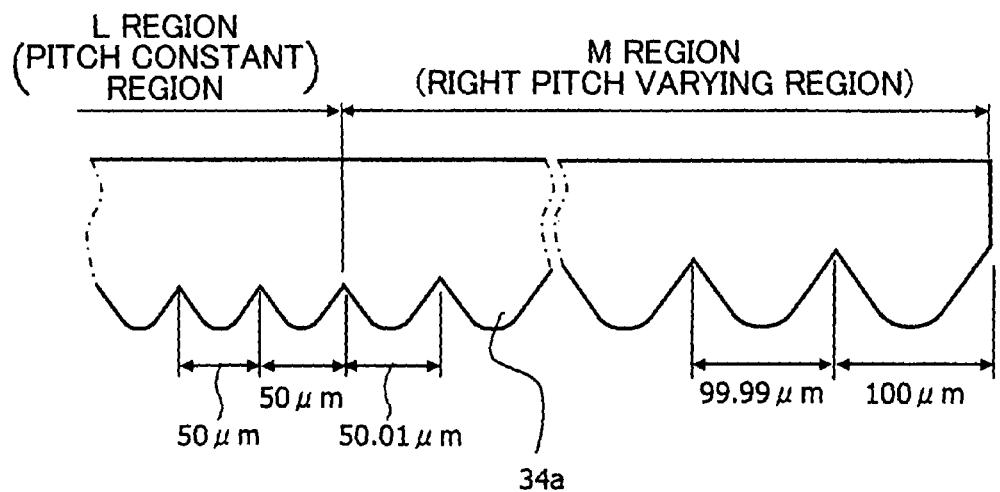

FIG.28
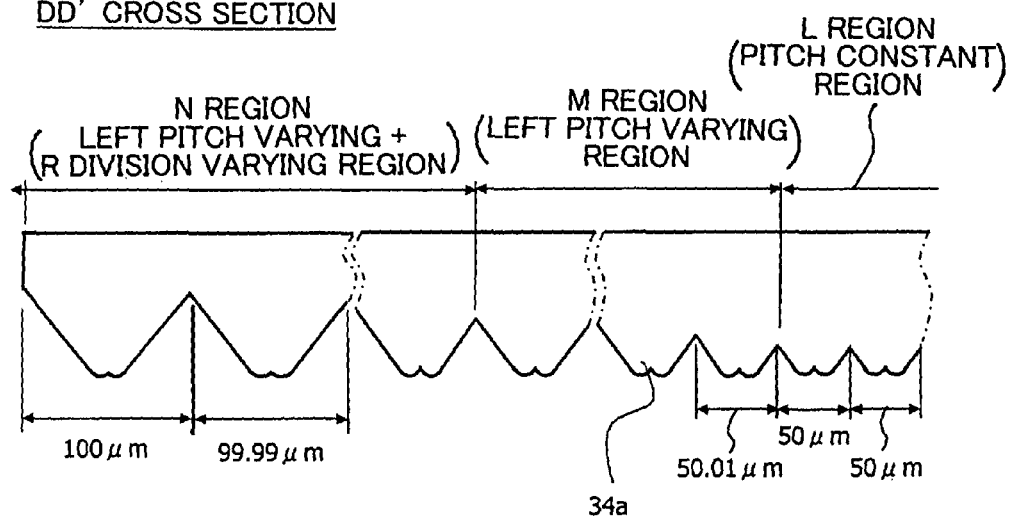
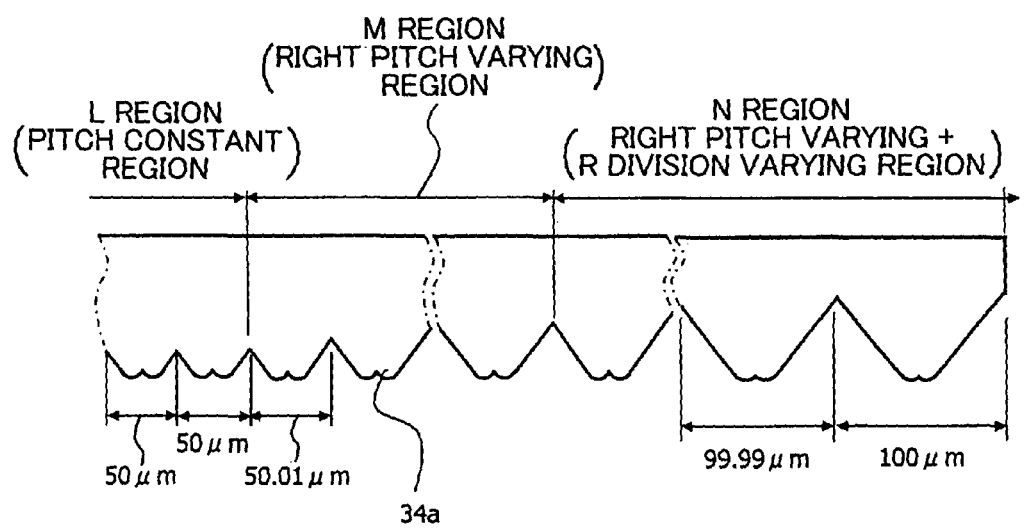

LIGHT GUIDE FOR SURFACE LIGHT SOURCE DEVICE AND SURFACE LIGHT SOURCE DEVICE

BACKGROUND OF THE INVENTION

1. Field of the Invention

The present invention relates to a surface light source device of an edge light system and a light guide used therefor, in particular, to a surface light source device designed to reduce visibility of brightness unevenness and a light guide used therefor. The surface light source device of the present invention is suitable, for example, for a backlight of a liquid crystal display device used as a monitor of a portable notebook personal computer and a display part of a liquid crystal television or a video integrated liquid crystal television. Further, the device of the present invention is suitable for a backlight of a liquid crystal display device of a comparatively small size used as a display panel of portable type electronic equipment such as a portable telephone and an indicator of a variety of types of equipment. Furthermore, the device of the present invention is suitable for a backlight of a liquid crystal display device used as a guide display board or a signboard in a station or a public facility. Further, the device of the present invention is suitable for a backlight of a liquid crystal display device used as a marking device of a traffic sign or the like on a superhighway or an ordinary road.

2. Description of the Related Art

A liquid crystal display device has been widely used as a monitor of a portable notebook personal computer or the like, or a display part of a liquid crystal television and a video integrated liquid crystal television, and further in a variety of other fields. The liquid crystal display device is basically configured with a backlight and a liquid crystal display element. As the backlight, an edge light type has been frequently used in view of reducing diameter of the liquid crystal display device. The widely used backlight of edge light type has a configuration in which at least one end face of a light guide in a rectangular plate shape is used as a light incident end face, a primary light source of a linear shape or a stick shape such as a straight tube type fluorescent lamp is allocated along the light incident end face, light emitted from the primary light source is introduced to the inside of the light guide from the light incident end face of the light guide, and the light exits from a light exit face, which is one of two principal faces of the light guide.

In such a backlight, unevenness may occur in a brightness distribution of a light emitting face (a brightness uniformity may be reduced), due to a propagation form of light generated by the primary light source and emitted through the light guide. As one form of the reduction in brightness uniformity, brightness of a region in the vicinity of the primary light source becomes higher than other regions.

As a technique for preventing the reduction in brightness uniformity as described above, for example, JP-Y-40-26083 (Patent Document 1), JP-U-60-60788 (Patent Document 2), and JP-U-62-154422 (Patent Document 3) disclose allocation of a film having a light absorption property or a light beam adjusting film for restricting light transmission in the vicinity of the primary light source on a light exit face of the light guide. This technique is merely for limiting light emission from a light exit face area having a small distance from the primary light source to cope with that intensity of light emitted from the light exit face of the light guide in a region in the vicinity of the primary light source is larger than intensity of light emitted from a region far from the primary light source.

In recent years, the liquid crystal display device has been required to have a proportion of display screen dimensions with respect to outer shape dimensions of the liquid crystal display device as large as possible so that display efficiency is improved. Therefore, with respect to the surface light source device as well, a proportion of light emitting face dimensions with respect to outer dimensions has required to be made as large as possible, that is, dimensions of a structural part (sometimes called "frame") existing in a frame shape in the periphery of the light emitting face has been required to be made as small as possible.

On the other hand, the surface light source device is required to be thin. In response to such a requirement, the light guide needs to be made thinner. Due to the thinning of the light guide (for example, a thickness of about 0.5 mm to 3 mm), as a special form of the reduction in brightness uniformity, a bright part in a streak shape (emission line) which is brighter than a surrounding part is sometimes observed in parallel with the light incident end face of the light guide in accordance with a light exit face position in the vicinity (for example, about 2 mm) of the light incident end face. That is, the effect in which light emitted from the primary light source functions as a secondary light source at a light guide ridge line which makes a boundary between the light incident end face and the light exit face of the light guide appears as brightness of the light emitting face of the surface light source device. This effect significantly appears mainly in a region close to the light incident end face. This phenomenon is not a problem in actuality when a width of the frame is large. However, in case of the surface light source device having the frame with a small width as described above, there is a problem that brightness unevenness due to the effect is readily visually identified. When a technique described in the above Patent Documents 1 to 3 is adopted to prevent the reduction in brightness uniformity due to the emission line, there is a problem that brightness of not only the emission line, but also of the entire surrounding part of the emission line is readily reduced.

On the other hand, due to the generation of the emission line as described above, a dark part in a streak shape (a dark line), which is darker than a surrounding part, is sometimes observed in parallel with the light incident end face. JP-A-08-227074 (Patent Document 4) describes that, as a technique for preventing generation of such a dark line, a light absorption layer having a light absorption pattern in which a light absorption rate gradually decreases as the light absorption layer becomes far from the light incident end face is formed.

In the technique of Patent Document 4 described above, a pattern such as a dotted pattern is adopted as a light absorption pattern. However, in this case, there partially exists a region that does not absorb light, and light shielding in this region is insufficient. As a result, there is a problem that an emission line is observed in this region.

As described above, as one form in which brightness unevenness of the light emitting face is readily visually identified, a part with high brightness (emission line or emission band) and a part with low brightness (dark line or dark band) are generated in a specific interval in a region in the vicinity of the light incident end face, and such parts are visually identified as a plurality of light and dark lines extending in substantial parallel with the light incident end face.

As a technique for preventing the brightness unevenness in the vicinity of the light incident end face as described above, for example, JP-A-10-153778 (Patent Document 5) discloses that a light diffusion region in a band shape having a higher light scattering property than an adjacent region is provided in a region in the vicinity of the light incident end face of the light exit face. In addition, in order to achieve a similar object, for example, JP-A-2002-216530 (Patent Document 6) discloses that an average inclination angle of a surface of a region in the vicinity of the light incident end face of the light exit face is made larger than other regions of the light exit face.

According to the techniques in Patent Document 5 and Patent Document 6 described above, a light scattering property and a light diffusion property in a region in the vicinity of the light incident end face of the light exit face are intensified to increase an amount of exit light in this area. In this manner, a dark band is made inconspicuous so that brightness unevenness is reduced.

As another form of the reduction in brightness uniformity, brightness in the vicinity of two end faces adjacent to the light incident end face of the light guide is lower than other regions of the light exit face. This form is conspicuous especially in a region of the light exit face in the vicinity of corner parts of the light guide where the two end faces described above and the light incident end face intersect with each other.

As described above, dimensions of the frame are required to be made smaller, and dimensions of the primary light source in a linear shape or a stick shape allocated along the light incident end face of the light guide need to be reduced. The reduction of dimensions is achieved by reducing, that is, thinning a width of the primary light source on one hand, and is achieved by reducing a length of the primary light source, that is, making the length of the primary light source shorter than the light incident end face of the light guide, where the primary light source faces, on the other hand.

However, when an attempt is made to reduce the length of the primary light source, a problem to be described below occurs. That is, a socket is attached to at least one end part of the primary light source, and this end part is a non-light emitting part that does not emit light in practice. For this reason, the non-light emitting part exists at a position facing the light incident end face as a result of the reduction of dimensions, and an amount of light emitted from the light exit face at corner parts of the light guide corresponding to the non-light emitting part becomes little. Then, brightness of this part is lowered and brightness unevenness is generated.

With the aim of resolving the problems described above, for example, JP-A-2002-169033 (Patent Document 7) discloses that fine angular grains are provided in a superposed manner in regions, for example, both corners on a light incident side or a side edge part, where brightness is relatively reduced in the light exit face of the light guide. In addition, for example, JP-A-2002-258057 (Patent Document 8) discloses that an average inclination angle in the vicinity of a corner part where brightness is relatively reduced in the light exit face of the light guide is made larger than average inclination angles of other parts.

Patent Document 1: JP-Y-40-26083

Patent Document 2: JP-U-60-60788

Patent Document 3: JP-U-62-15442

Patent Document 4: JP-A-08-227074

Patent Document 5: JP-A-10-153778

Patent Document 6: JP-A-2002-216530

Patent Document 7: JP-A-2002-169033

Patent Document 8: JP-A-2002-258057

An object of the present invention is to provide a surface light source device in which brightness unevenness is not readily visually identified and a light guide used therefor. In particular, such brightness unevenness includes brightness unevenness in a region in the vicinity of the light incident end face of the light guide that occurs due to the reduction in thickness of the light guide, or brightness unevenness in a region of the light exit face in the vicinity of a corner part of the light guide in the vicinity of the light incident end face that occurs due to the reduction of dimensions of the frame.

SUMMARY OF THE INVENTION

According to the present invention, in order to achieve the above objects, there is provided a light guide for a surface light source device or surface light source that is used for configuring or constituting the surface light source device in combination with a primary light source and guides light emitted from the primary light source, including: a light incident end face on which light emitted from the primary light source is incident or impinges, a light exit face from which guided light exits, and a rear surface on an opposite side of the light exit face; and a plurality of elongated prisms or prism arrays extending in a direction traversing the light incident end face formed on at least one of the light exit face and the rear surface, each of the elongated prisms having a plurality of divided top portions where a top portion of each elongated prism is divided in a cross-sectional profile thereof in at least a part of a region with respect to an extending direction thereof.

According to an aspect of the present invention, each of the divided top portions has a cross-sectional profile including a convex curved line. According to an aspect of the present invention, there exists a division ratio varying region where a division ratio indicating a degree of division of the top portion varies with respect to the extending direction. According to an aspect of the present invention, the division ratio monotonously varies continuously with respect to the extending direction in the division ratio varying region. According to an aspect of the present invention, a plurality of the division ratio varying regions are provided. According to an aspect of the present invention, the division ratio continues with respect to the extending direction. According to an aspect of the present invention, a position of a boundary between the division ratio varying region and a region where the division ratio is constant changes with respect to an arrangement direction of the elongated prisms so as not to be the same among four or more of the elongated prisms positioned continuously with respect to the arrangement direction of the elongated prisms. According to an aspect of the present invention, a center region and both side regions thereof with respect to the arrangement direction of the elongated prism on the light exit face or the rear surface having the elongated prism formed thereon have different forms of distribution of the division ratio with respect to the extending direction.

Further, according to the present invention, in order to achieve the above objects, there is provided a light guide for a surface light source device that is used for configuring the surface light source device in combination with a primary light source and guides light emitted from the primary light source, including: a light incident end face on which light emitted from the primary light source is incident, a light exit face from which guided light exits, and a rear surface on an opposite side of the light exit face; and a plurality of elongated prisms extending in a direction traversing the light incident end face formed on at least one of the light exit face and the rear surface, the elongated prisms having an arrangement pitch varying in at least a part of a region with respect to an arrangement direction thereof.

According to an aspect of the present invention, a plurality of regions where the arrangement pitch of the elongated prism varies exist. According to an aspect of the present invention, a region where the arrangement pitch of the elongated prism is constant and a region where the arrangement pitch of the elongated prism continuously increases or decreases toward an end part are provided. According to an aspect of the present invention, a varying rate of the arrangement pitch varies in a region where the arrangement pitch of the elongated prism varies. According to an aspect of the present invention, the elongated prism has the varying rate of the arrangement pitch of the elongated prism different with respect to the extending direction thereof. According to an aspect of the present invention, there is at least one region where the arrangement pitch continuously increases or decreases from a center part to an end part in the extending direction of the elongated prism.

In addition, according to the present invention, in order to achieve the above objects, there is provided a surface light source device including: a light guide for the surface light source device described above; a primary light source arranged or allocated in a manner facing a light incident end face of the light guide; and a light deflection element arranged or allocated on a light exit face of the light guide.

According to an aspect of the present invention, the light deflection element includes a plurality of elongated prisms extending along the light incident end face of the light guide and arranged in parallel with each other on a light incident surface positioned in a manner facing the light exit face of the light guide, and each of the elongated prisms thereof has a first prism surface on which light from the light exit face of the light guide is incident and a second prism surface on which the incident light is internally reflected.

According to the present invention as described above, each of a plurality of elongated prisms that extend in a direction traversing the light incident end face on at least one of the light exit face and a rear surface of the light guide for the surface light source device is configured to have:

(1) a top portion in a cross-sectional profile divided into a plurality of divided top portions in at least a part of a region with respect to the extending direction thereof; or (2) an arrangement pitch changing in at least a part of a region with respect to an arrangement direction thereof.

In this manner, a surface light source device in which brightness unevenness is not readily visually identified and a light guide used therefor are readily provided. In particular, such brightness unevenness includes brightness unevenness in a region in the vicinity of the light incident end face of the light guide that occurs due to the reduction in thickness of the light guide, or brightness unevenness in a region of the light exit face in the vicinity of a corner part of the light guide in the vicinity of the light incident end face that occurs due to the reduction of dimensions of the frame.

BRIEF DESCRIPTION OF DRAWINGS

FIG. 19 shows a shape of a cross section of the elongated prism portion in each of the regions of the light guide of FIG. 18;

FIG. 23 shows a shape of a cross section of the elongated prism portion in each of the regions of the light guide of FIG. 20;

FIG. 24 shows a shape of a cross section of the elongated prism portion in each of the regions of the light guide of FIG. 20;

FIG. 28 shows a shape of a cross section of the elongated prism portion in each of the regions of the light guide of FIG. 25;

EXPLANATION OF REFERENCE SYMBOLS

1 a primary light source; 2 a Light source reflector; 3 a light guide; 31 a light incident end face; 32 a side end face; 33 a light exit face; 34 a rear surface; 34a an elongated prism; 34a1, 34a2 divided top portions; 4 a light deflection element; 41 a light incident surface; 42 a light exit surface; 5 a light reflection element; and, 8 a liquid crystal display element

DETAILED DESCRIPTION OF THE PREFERRED EMBODIMENTS

Hereinafter, embodiments of the present invention will be described with reference to the accompanying drawings.

Figure 1:
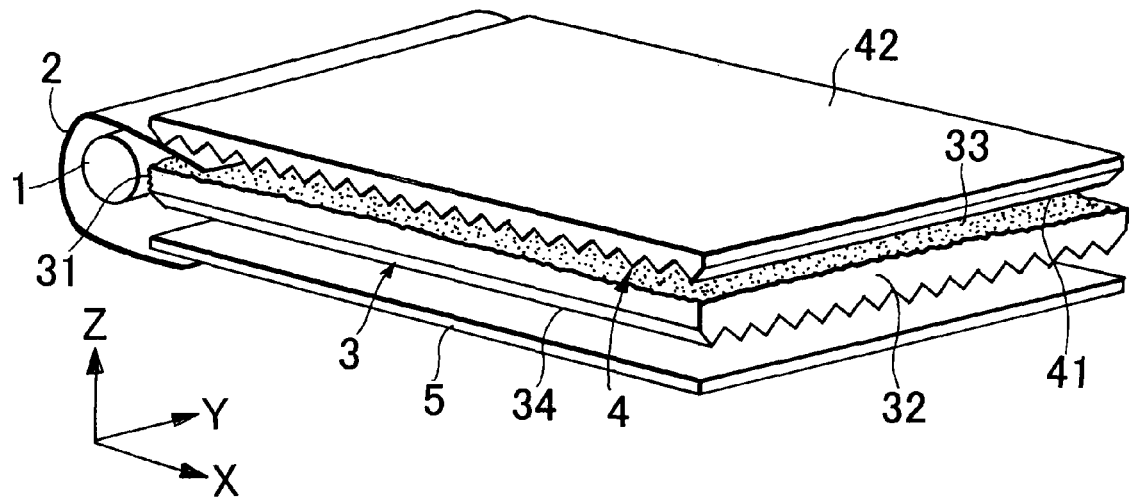
FIG. 1 is a schematic perspective view showing an embodiment of a surface light source device according to the present invention.
Figure 2:
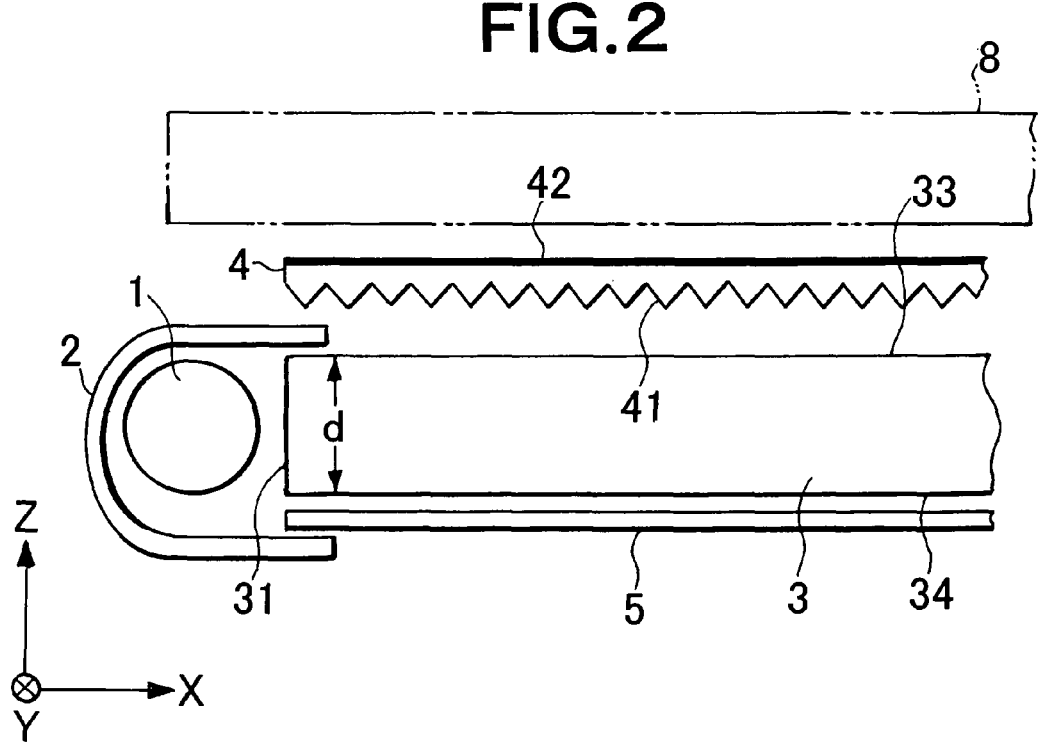
FIG. 2 is a partial cross-sectional view of the surface light source device of FIG. 1.

FIG. 1 is a schematic perspective view showing one embodiment of a surface light source device according to the present invention and FIG. 2 is a partial cross-sectional view thereof. As illustrated, the surface light source device of the present embodiment includes a light guide 3 having at least one side end face thereof as a light incident end face 31 and one face substantially orthogonally intersecting the light incident end face 31 as a light exit face 33, a primary light source 1 in a linear shape allocated in a manner facing the light incident end face 31 of the light guide 3 and covered with a light source reflector 2, a light deflection element 4 allocated on the light exit face of the light guide 3, and a light reflection element 5 allocated in a manner facing a rear surface 34 on an opposite side of the light exit face 33 of the light guide 3.

The light guide 3 is allocated in parallel with an XY plane, and formed in a rectangular plate shape as a whole. The light guide 3 has four side end faces, among which at least one side end face of a pair of side end faces parallel with a YZ plane is the light incident end face 31. The light incident end face 31 is allocated in a manner facing a primary light source 1. Light emitted from the primary light source 1 is incident on the light incident end face 31 and introduced to the light guide 3. In the present invention, for example, a primary light source may be allocated in a manner facing any of other side end faces, such as a side end face 32 in an opposite side of the light incident end face 31.

Each of two principal faces substantially orthogonally intersecting the light incident end face 31 of the light guide 3 is positioned in substantial parallel relationship with the XY plane. One of the faces (a top face in FIGS. 1 and 2) is the light exit face 33. By providing a directional light exit mechanism including a rough surface or an elongated lens on the light exit face 33, light with directivity on a plane (XZ plane) orthogonally intersecting the light incident end face 31 and the light exit face 33 is emitted from the light exit face 33 while the light incident from the light incident end face 31 is guided in the light guide 3. An angle formed by a direction of a peak in an exit light brightness intensity distribution (peak light) in the distribution in the XZ plane with the light exit face 33 is α. The angle α is, for example, 10 to 40 degrees, and a full width at half maximum of the exit light brightness intensity distribution is, for example, 10 to 40 degrees.

The rough surface or the elongated lens formed on the surface of the light guide 3 is preferably within a range that an average inclination angle θa according to ISO4287/1-1984 is 0.5 to 15 degrees, in view of attempting a uniformity of brightness in the light exit face 33. The average inclination angle θa is further preferably within a range of 1 to 12 degrees, and more preferably within a range of 1.5 to 11 degrees. The average inclination angle θa preferably has an optimum range set by a ratio (L/t) between a thickness (t) of the light guide 3 and a length (L) in a direction in which incident light propagates. That is, in case the light guide 3 with L/t of around 20 to 200 is used, the average inclination angle θa is preferably 0.5 to 7.5 degrees, further preferably within a range of 1 to 5 degrees, and more preferably within a range of 1.5 to 4 degrees. In addition, in case the light guide 3 with L/t of around 20 or less is used, the average inclination angle θa is preferably 7 to 12 degrees, and more preferably within a range of 8 to 11 degrees.

The average inclination angle θa of the rough surface formed on the light guide 3 can be obtained by using the following formulas (1) and (2) from an inclination function f(x) obtained by measuring a shape of the rough surface by using a stylus type surface roughness measuring instrument in accordance with ISO4287/1-1984 where a coordinate in a measuring direction is x:

$$\Delta a = (1/L)\int_0^L |(d/dx)f(x)|dx \qquad (1)$$

$$\theta a = \tan^{-1}(\Delta a) \qquad (2)$$

Here, L is a measuring length and Δa is a tangent of the average inclination angle θa.

Further, the light guide 3 preferably has a light exit rate within a range of 0.5 to 5% and more preferably within a range of 1 to 3%. This is because, sufficient brightness tends not to be obtained when the light exit rate is lower than 0.5% and an amount of light emitted from the light guide 3 is reduced. Also, when the light exit rate is higher than 5%, a large amount of light is emitted in the vicinity of the primary light source 1, and attenuation of the emitted light in an X direction becomes significant in the light exit face 33, and a uniformity of brightness tends to be lowered in the light exit face 33. By setting the light exit rate of the light guide 3 at 0.5 to 5% as described above, the light guide 3 can emit light with an emitting characteristic of high directivity, where an angle of the peak light in the exit light brightness intensity distribution (in the XZ plane) of light emitted from the light exit face is within a range of 50 to 80 degrees with respect to a normal line of the light exit face, and a full width at half maximum of the exit light brightness intensity distribution (in the XZ plane) in the XZ plane perpendicular to both the light incident end face and the light exit face is within 10 to 40 degrees. Also, the light deflection element 4 can efficiently deflect the emitting direction of such light with the emitting characteristic of high directivity. In this manner, the surface light source device having high brightness can be provided.

In the present invention, the light exit rate from the light guide 3 is defined as follows. A relationship between a light intensity ($I_0$) of exit light at an end edge on a side of the light incident end face 31 of the light exit face 33 and an exit light intensity (I) at a position of a distance L from the end edge on the side of the light incident end face 31 satisfies the following formula (3) when a thickness (dimensions in a Z direction) of the light guide 3 is t:

$$I = I_0(\alpha/100)[1-(\alpha/100)]^{L/t} \qquad (3)$$

Here, a constant α is the light exit rate, and is a proportion (%) of light emission from the light guide 3 with respect to each unit length (a length equivalent to the thickness t of the light guide) in the X direction orthogonally intersecting the light incident end face 31 in the light exit face 33. The light exit rate α can be obtained by gradient obtained in a manner that, a logarithm of a light intensity of light emitted from the light exit face 33 is set on a vertical axis, (L/t) is set on a horizontal axis, and then relationships of these are plotted.

In the present invention, instead of, or together with, forming the light exit mechanism on the light exit face 33 as described above, a directional light exit mechanism can be provided by mixing into and dispersing light diffusion fine particles in the inside of the light guide.

In addition, the rear surface 34 which is a principal face on which the directional light exit mechanism is not provided is configured as an elongated prism formed surface, on which a number of elongated prisms extending in a direction traversing the light incident end face 31, or more specifically in a direction (X direction) substantially perpendicular to the light incident end face 31, are arranged so as to control the directivity on a plane (YZ plane) parallel with the primary light source 1 of light emitted from the light guide 3.

In the present embodiment, the elongated prisms on the rear surface 34 of the light guide 3 have a cross-sectional profile of the top portions having the following characteristics.

Figure 3:
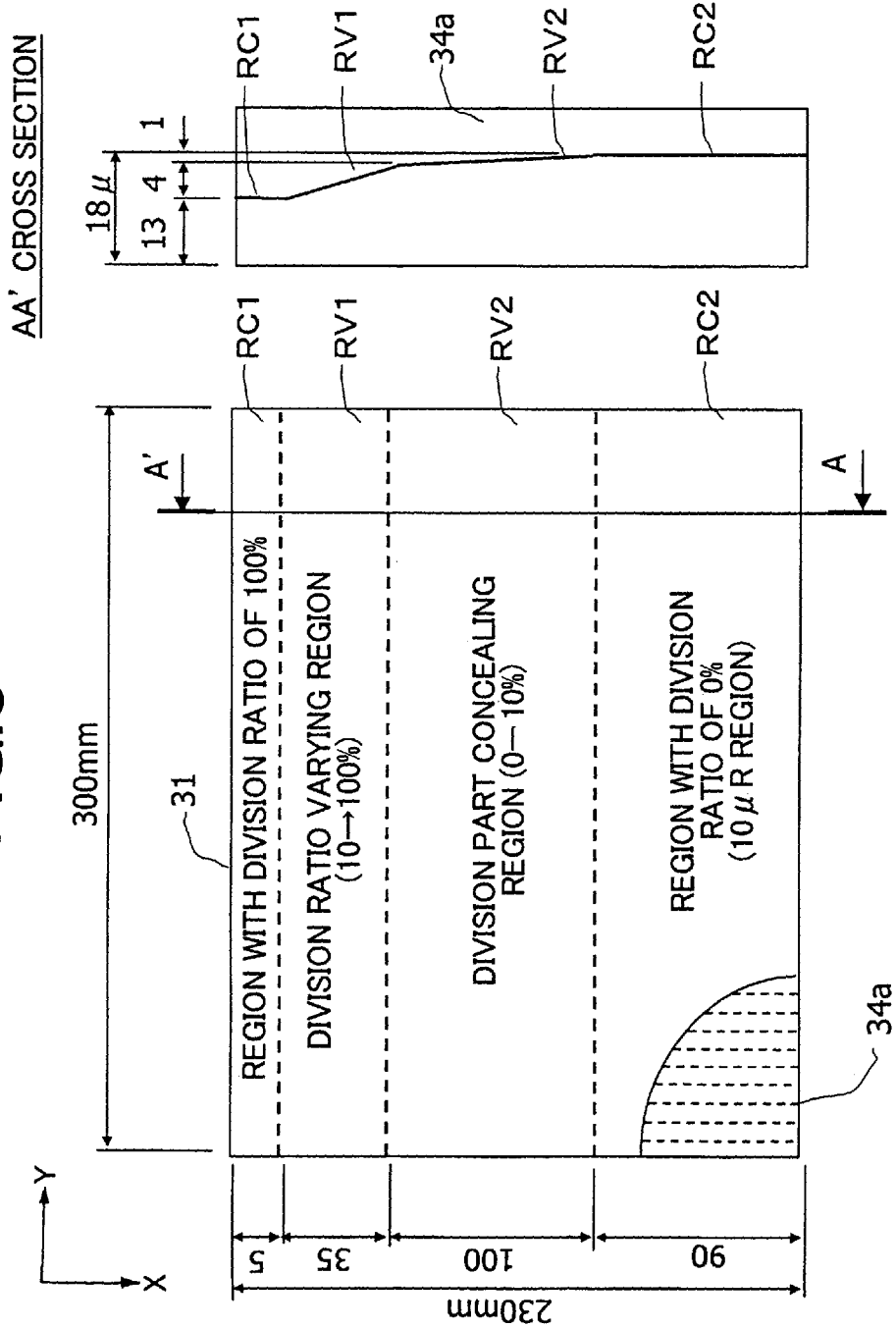
FIG. 3 shows a plan view of an embodiment of a light guide according to the present invention and an A-A' cross-sectional view of elongated prism portion thereof.

FIG. 3 shows a plan view of the light guide 3 and a cross-sectional view (A-A' cross section) thereof. FIG. 3 shows a state of the rear surface 34 seen through a light exit face side. An elongated prism 34a has a part including a curved line projecting outwardly in a cross-sectional profile on a top portion thereof, and has four regions classified by a form of the top portion. That is, the elongated prism 34a has four regions RC1, RV1, RV2, and RC2 positioned sequentially from a side of the light incident end face 31 with respect to an extending direction (X direction) thereof.

The above regions are with respect to each of the elongated prisms 34a. Four regions which can be obtained by synthesizing each of the regions RC1, RV1, RV2, and RC2 with respect to all the elongated prisms 34a arranged on the rear surface 34 may also be considered as regions with respect to the rear surface 34.

Figure 4:
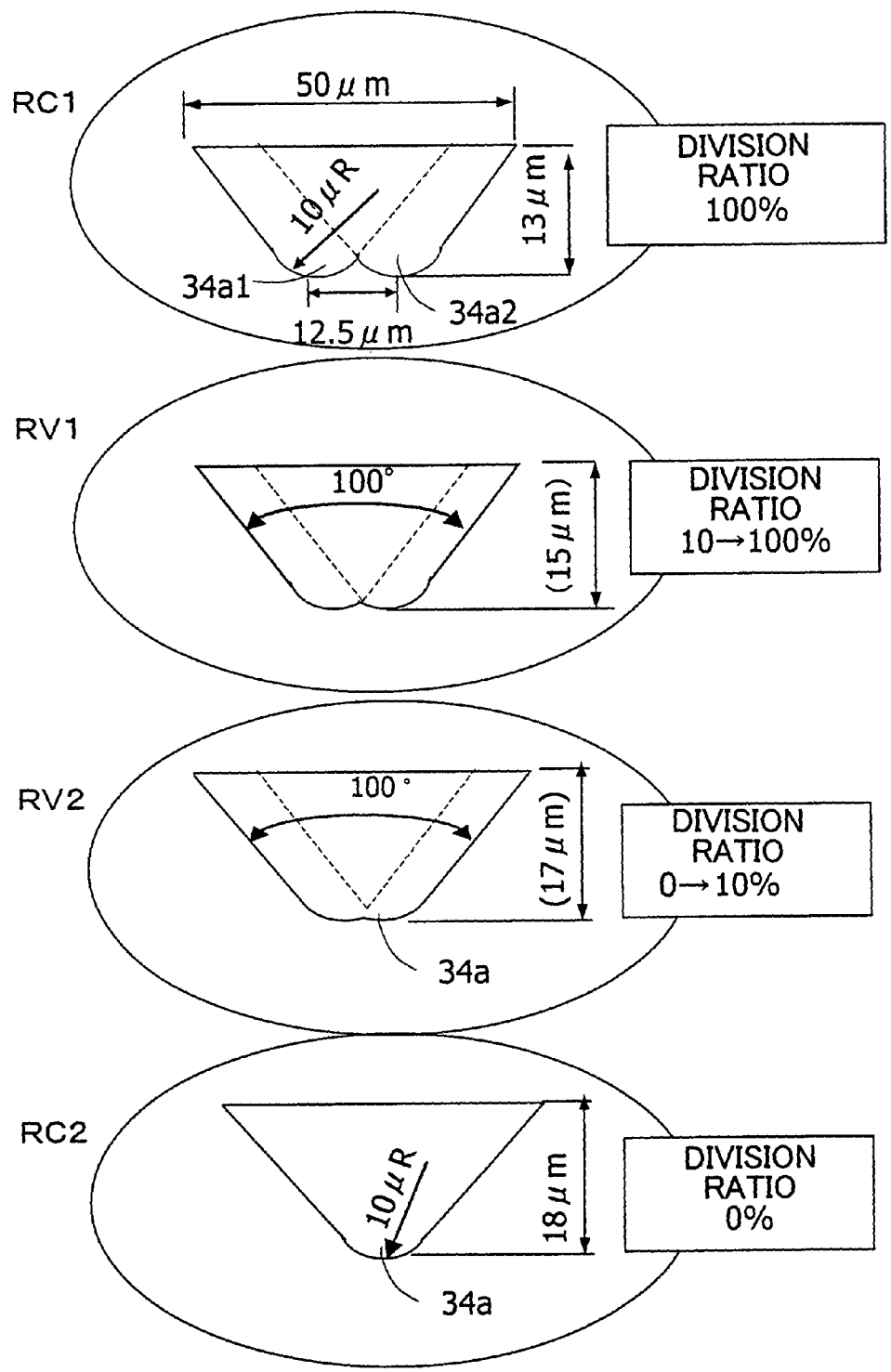
FIG. 4 shows a shape of a cross section of the elongated prism portion in each of the regions of the light guide of FIG. 3.

FIG. 4 shows a shape of a cross section orthogonally intersecting the extending direction of the elongated prism of a part of the elongated prism 34a in each of the regions RC1, RV1, RV2, and RC2. The elongated prism 34a has the top portion thereof (front end part: bottom end part in FIG. 4) divided into two portions in the cross-sectional profile, and has two divided top portions 34a1 and 34a2 formed by such division. Each of the divided top portions 34a1 and 34a2 has a cross-sectional profile including a curved line in a convex shape.

In the region RC1, a division ratio showing a degree of division of the top portion is 100% and a division width is 12.5 μm. Here, the division width is an arrangement pitch of the two divided top portions. In the region RC2, the top portion is not divided and the division ratio is 0% and the division width is 0 μm. The region RV1 is a division ratio varying region in which the division ratio changes with respect to the extending direction of the elongated prism 34a. Here, the division ratio changes in a range of 10 to 100% (division width of 1.25 μm to 12.5 μm) along the extending direction of the elongated prism 34a. The region RV2 is a division ratio varying region. Here, the division ratio changes in a range of 0 to 10% (a division width of 0 μm to 1.25 μm) in the extending direction of the elongated prism 34a.

As shown in FIG. 4, a cross-sectional profile of the top portion which is not divided in the region RC2, and a cross-sectional profile of each of the divided top portions 34a1 and 34a2 in the regions RC1, RV1, and RV2 are formed in an arc shape with an equivalent curvature radius (10 μm in FIG. 4). In a cross-sectional profile of the elongated prism 34a, side surface parts on both sides of the top portion (lower part in FIG. 4) are formed in straight lines. Angles (prism apex angles) formed by these straight lines are uniform (100° in FIG. 4) in all the regions RC1, RV1, RV2, and RC2 regardless of whether the top portion is divided or not. In addition, a length of a bottom line (a top line in FIG. 4) in a cross-sectional profile of the elongated prism 34a, that is, a width of the elongated prism (equivalent to the arrangement pitch of the elongated prism) is uniform (50 μm in FIG. 4) in all the regions RC1, RV1, RV2, and RC2. The dividing of the top portion is carried out by gradually lowering a height (dimensions of up and down direction in FIG. 4) of the elongated prism and by increasing the arrangement pitches of the divided top portions 34a1 and 34a2, from the region RC2 to the region RC1 through the regions RV2 and RV1, so as to form a boundary line (which appears as a boundary point in FIG. 4) between the divided top portions 34a1 and 34a2.

In the region RC2, the top portion is not divided, and the divided top portions 34a1 and 34a2 do not appear. The division ratio in this case is 0%.

In the region RC1, in a cross-sectional profile, a boundary point between the divided top portions 34a1 and 34a2 is positioned at the same height as a boundary point between curved line shapes of the divided top portions and straight line shapes of the side surface parts of the elongated prism. A distance (an arrangement pitch of the divided top portions) between a top point of the divided top portion 34a1 and a top point of the divided top portion 34a2 at this time is a predetermined value (12.5 μm in FIG. 4). The top portion division ratio in this case is 100%. Reasons therefor are as follows. That is, the division of the top portion of the elongated prism is for improving external appearance by increasing dimensions of a curved surface part of the top portion of the elongated prism, even by sacrificing performance of improving brightness in a manner of reducing dimensions of the side surface parts of the elongated prism. Even if the arrangement pitch of the divided top portions 34a1 and 34a2 is further increased beyond the arrangement pitch of the divided top portions at the time when the above divided ratio is 100%, a flat surface part in a straight line shape in a cross-sectional profile merely appears adjacent to each of the divided top portions 34a1 and 34a2 in the vicinity of the boundary point between the divided top portions 34a1 and 34a2, and such increase does not lead to increase in dimensions of the curved surface part. For this reason, an effect of increasing the external appearance cannot be obtained by increasing a proportion of dimensions of the curved surface part of the top portion of the elongated prism.

In the regions RV1 and RV2, the arrangement pitches of the divided top portions 34a1 and 34a2 are less than or equal to the arrangement pitches of the divided top portions at the time when the division ratio is 100%.

The division ratio is defined as a percentage of the arrangement pitches of the divided top portions 34a1 and 34a2 with respect to the arrangement pitches of the divided top portions 34a1 and 34a2 at the time when the division ratio is 100%.

The top portion division ratio in a cross-sectional profile monotonously varies continuously with respect to the extending direction of the elongated prism 34a. That is, in the region RV1, the division ratio is 100% at a boundary with the region RC1, the division ratio is 10% at a boundary with the region RV2, and the division ratio monotonously varies continuously between these boundaries. Here, the monotonous change means monotonous increase or monotonous decrease. Therefore, the division ratio linearly changes at a certain change rate throughout the entire area RV1 as illustrated.

In addition, in the region RV2, the division ratio at a boundary with the region RV1 is 10%, the division ratio at a boundary with the region RC2 is 0%, and the division ratio monotonously varies continuously between these boundaries. The region RV2 is a region where visibility of brightness discontinuity at boundary parts between regions is further reduced. In the region RV2, the division ratio changes from 10% to 0% within a comparatively long distance (100 mm), and a varying rate of the division ratio with respect to the extending direction of the elongated prism 34a is sufficiently smaller than the region RV1. Accordingly, the region RV2 serves to conceal existence of a divided part, and is called a division part concealing region.

As described above, the division ratio is continuous with respect to the extending direction of the elongated prism 34a throughout all of the division ratio varying regions RV1 and RV2, and the division ratio constant regions RC1 and RC2.

As a modification of the present embodiment, the region RC1 can be omitted. In addition, the region RV1 may be subdivided into a plurality of regions having a varying rate (varying rate with respect to the extending direction of the elongated prism 34a) of the division ratio different among each other. That is, for example, subdivided regions of the above area RV1 can be set, so that, with respect to each of the subdivided regions from a boundary side of the region RV2 to a boundary side of the region RC1, a ratio of (a difference ($\mu m$) between a maximum value and a minimum value of the arrangement pitches of the divided top portions/a dimension (mm) of the subdivided region in the extending direction of the elongated prism) changes in the order of 0.08→0.15→0.2→0.257.

FIGS. 3 and 4 exemplify dimensions of each part of the light guide 3. Here, as the arrangement pitch of the elongated prism 34a, 50 $\mu m$ is exemplified. The arrangement pitch of the elongated prism 34a may be, for example, within a range of 5 to 300 $\mu m$, and preferably within a range of 10 to 150 $\mu m$.

In addition, here, an angle of 100° is exemplified as an angle formed by the two side surface parts of the prism 34a. In the present invention, the angle formed by the two side surface parts of the elongated prism 34a may be within a range of 80 to 150 degrees. A reason for this is that exit light from the light guide 3 can be appropriately concentrated by setting the angle in the above range, and improvement of brightness of the surface light source device can be achieved. More preferably, the angle is within a range of 90 to 140 degrees.

In particular, in application to a display for a mobile device, a cross-sectional profile of the top portion of the elongated prism 34a has a great impact on risk such as fracture of the top portion of the elongated prism due to shock and brightness performance. By setting a curvature radius R of the top portion of the elongated prism to be small, a prism effect can be improved and thus brightness can be improved. Nevertheless, an emission line in the vicinity of the light incident face is intensified, and, when used for a mobile purpose, there is a concern of damaging the top portion of the elongated prism due to shock while carried around. On the other hand, when the curvature radius R of the top portion of the elongated prism is set to be large, the concern described above is avoided; nevertheless, the brightness performance itself is lowered. In the present embodiment, although not limited thereto, a cross-sectional profile of a perfect arc of a curvature radius of 10 $\mu m$ is exemplified. When a curved line in a cross-sectional profile of the top portion of the elongated prism 34a is approximated to a perfect arc, the curvature radius R of the perfect arc may be within a range of 2 to 50 $\mu m$, and preferably within a range of 5 to 30 $\mu m$. In addition, other than a perfect arc, non-arc shape is also useful.

The divided top portions 34a1 and 34a2 are basically allocated at an equivalent height between each other. However, in consideration of cutting processing in manufacturing a molding member used for molding synthetic resin, a height of one of the division top portions may be different from a height of the other division top portion (for example, for a difference of 1 $\mu m$).

The light guide 3 as described above can be manufactured by molding translucent synthetic resin by using a first molding member having a first transfer surface that transfers and forms the light exit face 33 and a second molding member having a second transfer surface that transfers and forms the rear surface 34. Here, when the second transfer surface for transferring and forming the rear surface 34 is formed, a corresponding part of the elongated prism in the second molding member corresponding to the elongated prism 34a can be formed by cutting processing by using a tool having the same cross-sectional profile as a cross-sectional profile of the elongated prism when there is no division of the top portion.

As a diamond tool used for the cutting processing of the second molding member, a tool made of monocrystal diamond is used in view of stability of processing and finishing accuracy of a processed surface. In the cutting processing, a shape of the diamond tool is transferred as it is, therefore stability of the shape of the tool is one of the most important performances. In addition, accurate mounting of a diamond chip in a shank part of the tool is also important. For this reason, the diamond chip is once fixed on a super hard stage, and the stage having the diamond chip is fixed with a screw to a fixing stage called a shank made of S45C. In this system of fixing with a screw, adjustment of an angle between the shank and the diamond chip becomes possible, and therefore an amount of angle correction at the time of mounting to a processing machine can be reduced.

As a material used for a part cutting-processed with the tool in the second molding member, nonferrous metal such as copper or copper-based alloy, or aluminum alloy can be used in consideration of machinability of a material with respect to diamond. However, a molding member used for injection molding of the translucent synthetic resin is required to have shape stability so as to stand high injection pressure. Therefore, electroless nickel plating having excellent shape stability and machinability processed in a thickness of, for example, 100 $\mu m$, can be used. In addition, as a base material of the molding material, stainless-based alloy being quenching-treated can be used.

Formation of a shape of the transfer surface corresponding to the divided top portions 34a1 and 34a2 is made possible by NC-controlling a track of the tool in a last finishing cutting or from a previous stage. A cutting depth and a shift amount in a pitch direction of the tool are appropriately changed at positions corresponding to the division ratio varying regions RV1 and RV2. In the NC control, setting of the track of the tool is possible in any method of linear interpolation and R interpolation. In consideration of simplicity in creating a program, the linear interpolation method is preferably adopted.

With respect to the divided top portions 34a1 and 34a2, a difference in height of around 1 $\mu m$ may be formed in consideration of the cutting processing for manufacturing the second molding member. That is, in the cutting processing for manufacturing the molding member, when the shape of the transfer surface corresponding to the divided top portions 34a1 and 34a2 is formed, a region where the top portion is not divided has the diamond tool passing twice as a common area. For this reason, attention for the wearing away of the tool is important, in a manner by using either of a method of providing certain cutting when the diamond tool passes the common area for the second time, and a method of idle-cutting of around 0.5 to 2 μm when the diamond tool passes the common area for the second time. In the present embodiment, the cutting processing can be carried out by making a 1 μm cut when the diamond tool passes the common area corresponding to the region RC2 for the second time.

The light guide 3 is not limited to the shape shown in FIG. 1. A variety of types of shapes, such as a wedge shape wherein the light incident end face has a larger thickness, can be used.

The light deflection element 4 is allocated on the light exit face 33 of the light guide 3. Two principal faces 41 and 42 of the light deflection element 4 are arranged in parallel with each other as a whole, and positioned in parallel with the XY plane as a whole. One of the principal faces 41 and 42 (a principal face positioned in a manner facing the light exit face 33 of the light guide 3) is a light incident surface 41, and the other is an exit light surface 42. The exit light surface 42 is a flat surface in parallel with the light exit face 33 of the light guide 3. The light incident surface 41 is an elongated prism formed surface having a number of elongated prisms extending in a Y direction arranged in parallel with each other. The elongated prism formed surface may be provided with a bottom-flat part (for example, a flat part having a width equivalent to or smaller than a dimension in the X direction of the elongated prism) having a comparatively smaller width between adjacent elongated prisms. In view of improving use efficiency of light, the elongated prisms are preferably arranged continuously in the X direction without providing the bottom-flat part.

Figure 30:
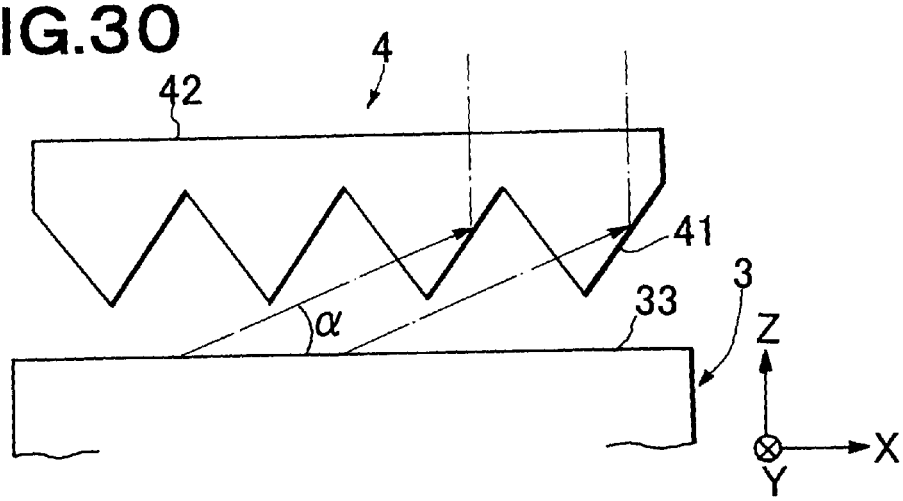
FIG. 30 schematically shows a state of light deflection by the light deflection element in the surface light source device according to the present invention.

FIG. 30 schematically shows a state of light deflection by the light deflection element 4. FIG. 30 shows one example of an advancing direction of the peak light (light corresponding to a peak of the exit light distribution) from the light guide 3 in the XZ plane. The peak light emitted obliquely in an angle of α from the light exit face 33 of the light guide 3 enters a first prism surface of the elongated prism, is totally internally reflected by a second prism surface, and outgoes in a direction of a substantial normal line of the exit light surface 42. In addition, in the YZ plane, by action of the elongated prism 34a of the rear surface 34 of the light guide as described above, sufficient improvement of brightness of the exit light surface 42 in the normal line direction in a wide range of a region can be attained. A shape of a prism surface of the elongated prism of the light deflection element 4 is not limited to a single flat surface, and may be a cross-sectional convex and multi-angle shape or a convex curved surface shape. In this manner, higher brightness and narrower view can be attained.

In the light deflection element 4, a top-flat part or a top-curved surface part may be formed at the top portion of the elongated prism, for the purpose of manufacturing a desired prism shape, obtaining stable optical performance, and also preventing abrasion and deformation of the prism top portion at the time of assembly work and at the time of being used as a light source device. In this case, a width of the top-flat part and the top-curved surface part is preferably 3 μm or less in view of preventing generation of an uneven pattern of brightness due to the reduction in brightness and a sticking phenomenon. More preferably, the width of the top-flat part or the top-curved surface part is 2 μm or less, and further preferably 1 μm or less.

The primary light source 1 is a linear light source extending in the Y direction. As the primary light source 1, for example, a fluorescent lamp and a cold cathode tube can be used. In this case, the primary light source 1 is not only provided in a manner facing one side end face of the light guide 3 as shown in FIG. 1, but may also be provided on a side end face opposite thereto as necessary.

The light source reflector 2 reduces loss of light when light from the primary light source 1 is guided to the light guide 3. As a material for the light source reflector 2, for example, a plastic film having a metal-evaporated reflective layer on a surface thereof may be used. As illustrated, the light source reflector 2 is wrapped around from an outer surface of an end edge part of the light reflection element 5, an outer surface of the primary light source 1, and to an end edge part of the light exit face of the light guide 3, in a manner avoiding the light deflection element 4. On the other hand, the light source reflector 2 may be wrapped around from an outer surface of an end edge part of the light reflection element 5, an outer surface of the primary light source 1, and to an end edge part of the light exit face of the light deflection element 4. A reflective member similar to the light source reflector 2 may be attached to a side end face of the light guide 3 other than the light incident end face 31.

As the light reflection element 5, for example, a plastic sheet having a metal-evaporated reflection layer on a front surface thereof may be used. In the present invention, as the light reflection element 5, a light reflection layer or the like formed by metal evaporation or the like may be used on the rear surface 34 of the light guide 3, in place of a reflection sheet.

The light guide 3 and the light deflection element 4 of the present invention may be constituted by synthetic resin having high light transmittance. As such synthetic resin, methacrylate resin, acrylic resin, polycarbonate-based resin, polyester-based resin, and polyvinyl chloride-based resin may be exemplified. In particular, methacrylate resin excels in light transmittance, heat-resisting properties, mechanical characteristics, and molding processing properties, and is most suitable. Such methacrylate resin preferably is resin including methyl methacrylate as the major component, and includes methyl methacrylate at 80% by weight or higher. When a surface structure, such as a rough surface, and a surface structure, such as an elongated prism or a lenticular elongated lens, of the light guide 3 and the light deflection element 4 are formed, such surface structures may be formed by heat-pressing a transparent synthetic resin plate by using a molding member having a desired surface structure, or a shape may be provided simultaneously as molding by screen printing, extrusion molding, injection molding, and so on. In addition, the structure surfaces may be formed by using heat or photo-curing resin, or the like. Further, a rough surface structure made of active energy line curing resin or an elongated lens arranging structure may be formed on a surface of a transparent base material such as a transparent film, a sheet, or the like made of polyester-based resin, acrylic-based resin, polycarbonate-based resin, polyvinyl chloride-based resin, polymethacrylimide-based resin, and the like. Such a sheet may be bonded and integrated with a separate transparent base material by a method such as bonding, fusing, and so on. As active energy line curing resin, a multifunctional (meth)acrylic compound, a vinyl compound, (meth)acrylic acid esters, an allyl compound, metal salts of (meth)acrylic acid, or the like can be used.

By arranging a transmission-type liquid crystal display element 8 on a light emitting surface (the light exit face 42 of the light deflection element 5) of the surface light source device including the primary light source 1, the light source reflector 2, the light guide 3, the light deflection element 4, and the light reflection element 5 as shown in FIG. 2, a liquid crystal display device having the surface light source device of the present invention as a backlight can be constituted. The liquid crystal display device is observed by an observer from the upper direction in FIG. 2.

In the present invention, the elongated prism 34$a$ formed on the rear surface 34 of the light guide has a cross-sectional profile with the top portion divided into two portions, that is, the two divided top portions 34$a$1 and 34$a$2, in a part of a region with respect to the extending direction of the elongated prism 34$a$. Therefore, by appropriately setting the division ratio showing a degree of the top portion division in this area, internal reflection of light and a mode of light collection by the elongated prism 34$a$ can be appropriately set. In particular, by setting the region RC1 having a constant division ratio in a region close to the light incident end face, while providing the region RV1 having a large change rate of the divisional ratio so as to make a starting position of shape change not readily visually identified, generation of brightness unevenness due to the emission line and the dark line in the vicinity of the light incident end face can be reduced.

Figure 5:
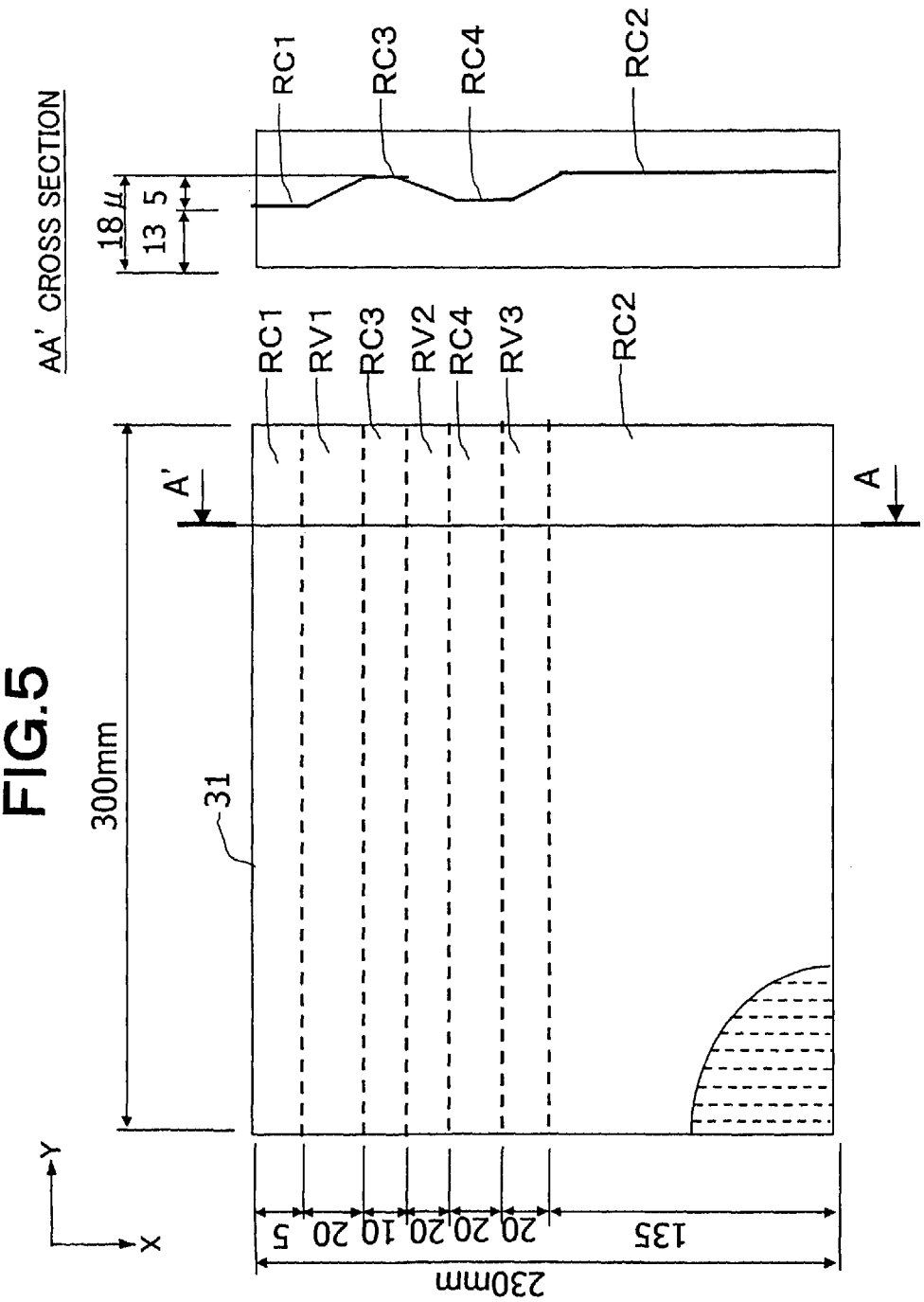
FIG. 5 shows a plan view of an embodiment of a light guide according to the present invention and an A-A' cross-sectional view of elongated prism portion thereof.
Figure 6:
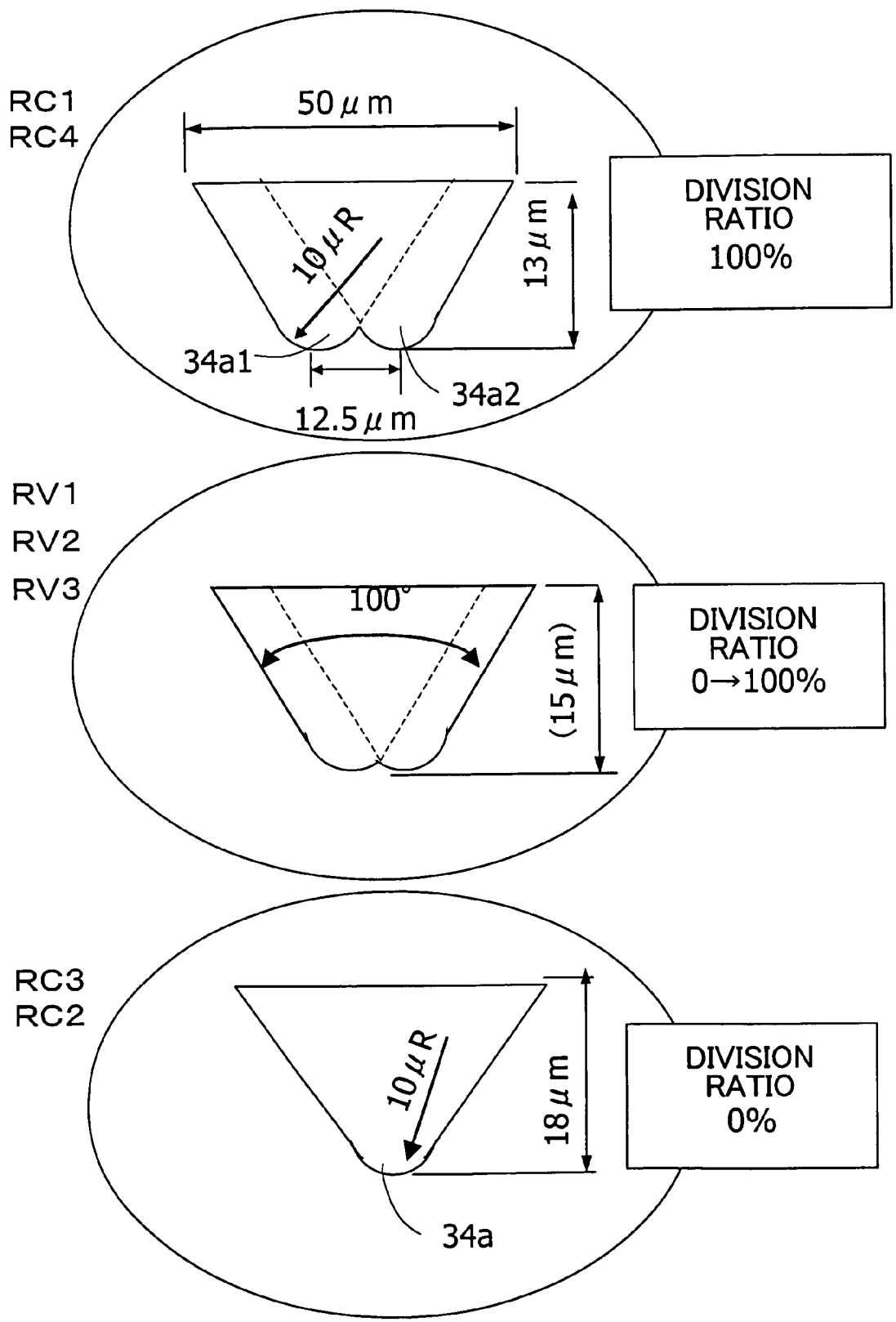
FIG. 6 shows a shape of a cross section of the elongated prism portion in each of the regions of the light guide of FIG. 5.

FIG. 5 shows a plan view of the light guide in another embodiment of the surface light source device of the present invention and an A-A' cross-sectional view of an elongated prism part thereof. In addition, FIG. 6 shows a cross-sectional profile of a part of the elongated prism in each region. In these views, a member or a part identical to that in the embodiment in FIGS. 1 to 4 described above is attached with the same numerical number.

In the present embodiment, a division ratio constant region RC3, a division ratio varying region RV2, a division ratio constant region RC4, and a division ratio varying region RV3 are allocated in this order from a side of the division ratio varying region RV1 between the division ratio varying region RV1 and the division ratio constant region RC2. As shown in FIGS. 5 and 6, the division ratio constant region RC4 has the same cross-sectional profile as the division ratio constant region RC1, and the division ratio constant region RC3 has the same cross-sectional profile as the division ratio constant region RC2. In addition, as shown in FIG. 5, in the division ratio varying region RV3, similar to the division ratio varying region RV1, the division ratio monotonously varies from 100% to 0% from a light incident end face side to an opposite side thereof. On the contrary, in the division ratio varying region RV2, the division ratio monotonously varies from 0% to 100% from the light incident end face side to the opposite side thereof. Further, the division ratios are made continuous over the entire regions RC1 to RC4 and the regions RV1 to RV3 with respect to the elongated prism extending direction.

In the present embodiment, a plurality of division ratio varying regions are provided to vary the division ratio over a plurality of times with respect to the elongated prism extending direction, therefore, in addition to an effect similar to the embodiment in FIGS. 1 to 4 described above, further improvement of the brightness uniformity on the light emitting surface of the surface light source device is enabled.

Figure 7:
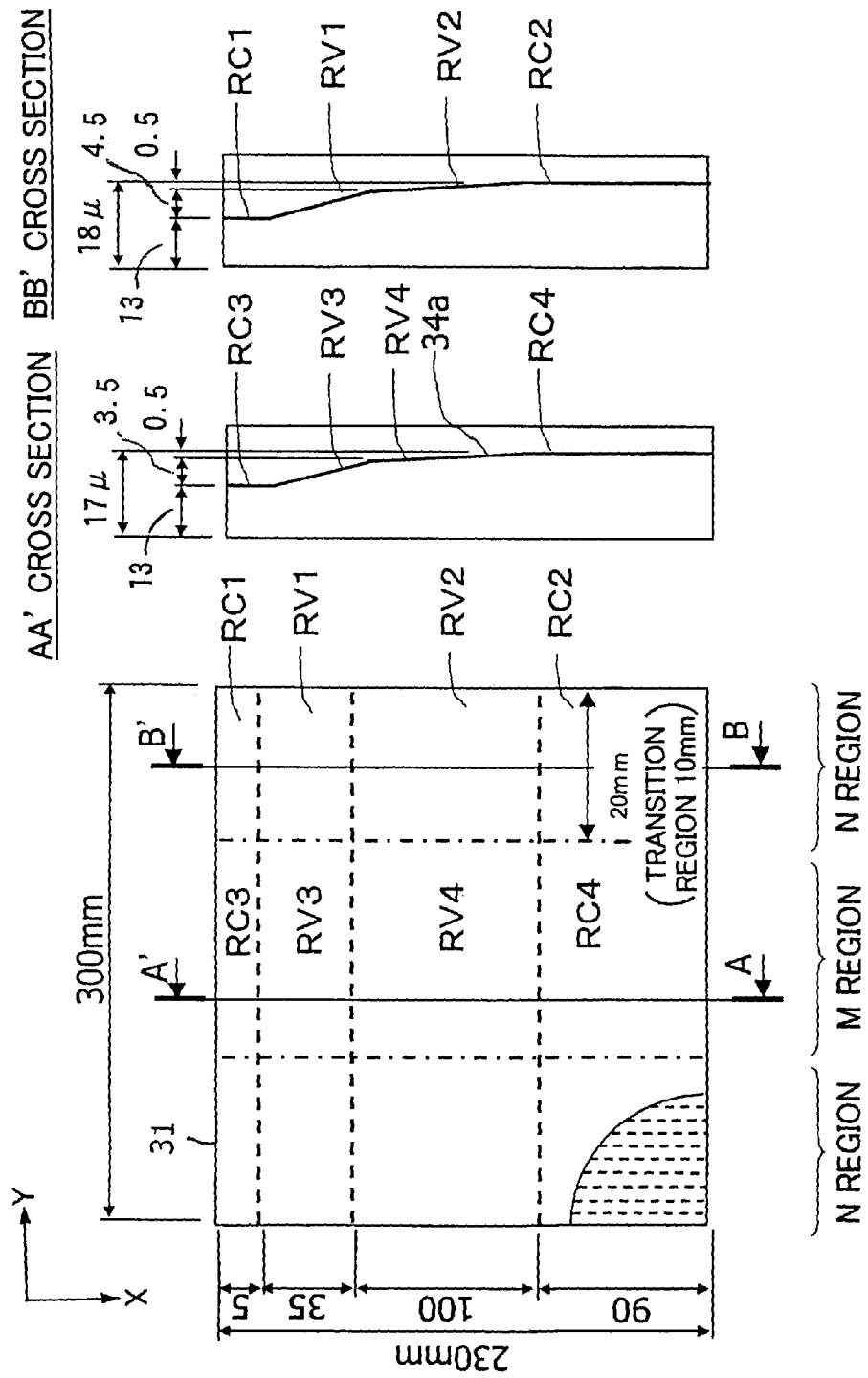
FIG. 7 shows a plan view of an embodiment of a light guide according to the present invention and A-A' and B-B' cross-sectional views of elongated prism portion thereof.
Figure 8:
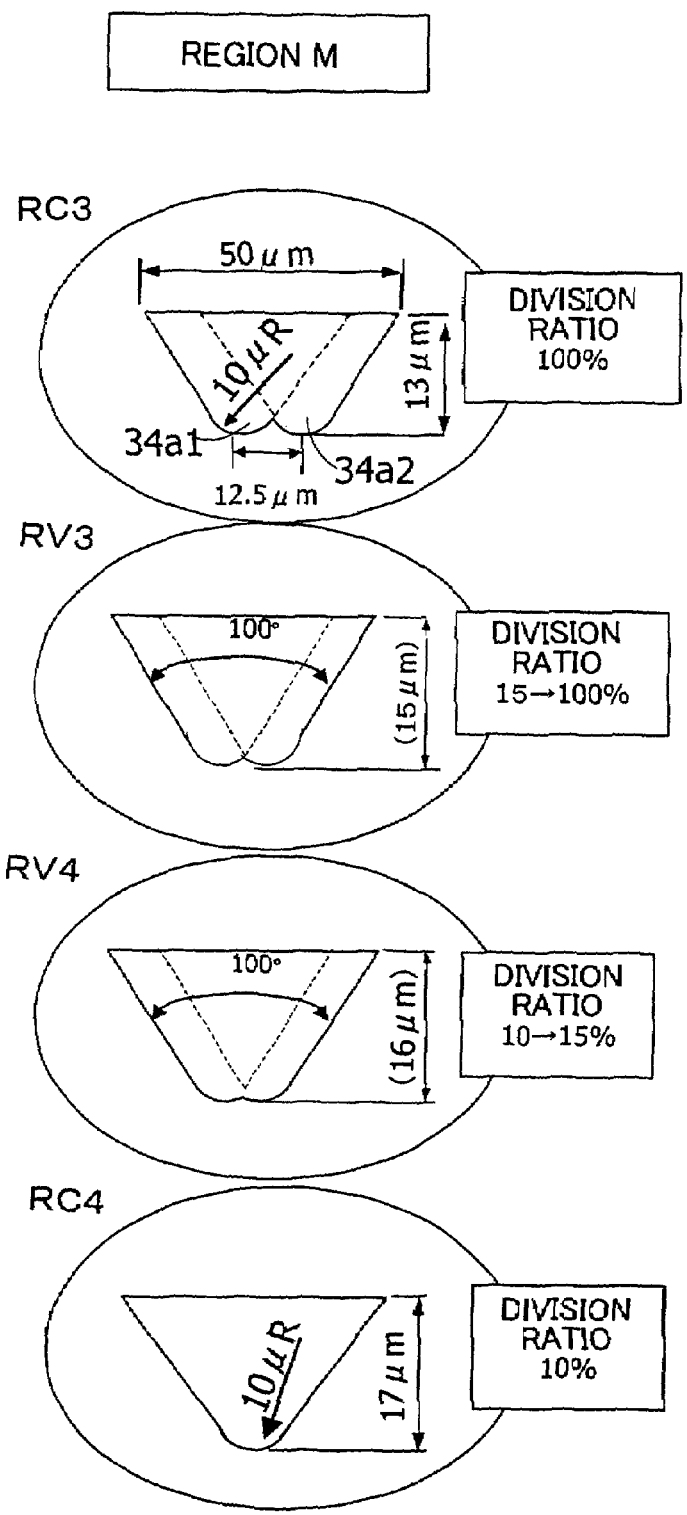
FIG. 8 shows a shape of a cross section of the elongated prism portion in each of the regions of the light guide of FIG. 7.
Figure 9:
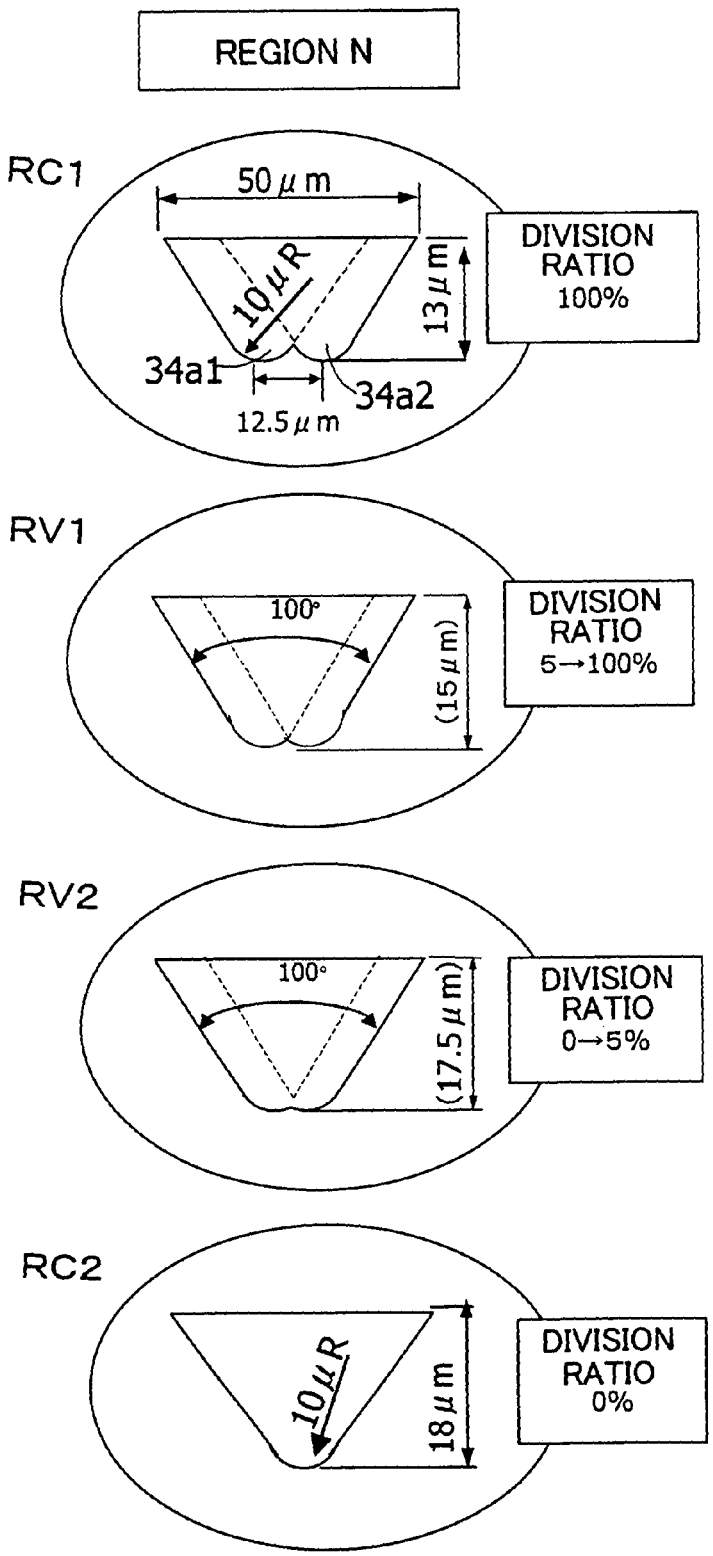
FIG. 9 shows a shape of a cross section of the elongated prism portion in each of the regions of the light guide of FIG. 7.

FIG. 7 shows a plan view of the light guide in further another embodiment of the surface light source device of the present invention and cross-sectional views (an A-A' cross section and an B-B' cross section) of an elongated prism part thereof. In addition, FIGS. 8 and 9 show a cross-sectional profile at the A-A' position and a cross-sectional profile at the B-B' position in different regions with respect to a direction (that is, a direction orthogonally intersecting the extending direction of the prism) of arrangement of the elongated prism.

In the present embodiment, a form of distribution of the division ratio with respect to the extending direction of the elongated prism is made different between a center region M and two regions N on both sides thereof with respect to the arrangement direction (Y direction) of the elongated prism on the rear surface of the light guide. A width (Y direction dimension) of the regions N is set to be 20 mm as shown in FIG. 7, for example. As a range thereof, a range of around 5 to 50 mm can be set depending on a degree of brightness spot represented by a dark part generated in the vicinity of both corner parts on the light incident end face of the light guide at the time when a certain division ratio distribution is set with respect to the arrangement direction of the elongated prism as in FIG. 3. In the division ratio varying regions RV3 and RV4 in the region M, the division ratio monotonously varies from 100% to 15% or 15% to 10%. In the division ratio varying regions RV1 and RV2 in the region N, the division ratio monotonously varies from 100% to 5%, or 5% to 0%. Then, with respect to the regions RC2 and RC4 adjacent to the division ratio varying regions RV2 and RV4, the region RC4 belonging to the region M has the division ratio of 10%, and the region RC2 belonging to the region N has the division ratio of 0%. That is, although the regions RC2 and RC4 are division ratio constant regions, division ratio values of these regions are different from each other.

In the present embodiment, the division ratio is made small at a part belonging to the region RC2 as compared with a part belonging to the region RC4. Therefore, in addition to the effect similar to the embodiment in FIGS. 1 to 4 described above, relative reduction in brightness of the region N of both end parts of the light guide as compared with the region M of a center part of the light guide can be intensively restricted. The non-divided top portion where so-called brightness performance becomes highest is allocated at a location (RC2 in the N region) where the brightness performance tends to be lowered. In a region (RC4 in the M region) where the brightness performance is originally comparatively high, the top portion of the elongated prism is divided with an appropriate division ratio in order to suppress the brightness performance.

When making a transition from a division ratio varying form with respect to the extending direction of the elongated prism in the M region to a division ratio varying form with respect to the extending direction of the elongated prism in the N region, rapid division ratio varying and shape varying are recognized as switching of appearance. Therefore, a form of distribution of the division ratio with respect to the extending direction of the elongated prism preferably sets to be led to a predetermined form so as not to rapidly varying the division ratio. For this reason, in the present embodiment, a division ratio transition region of a width of 10 mm is secured in the N region of a width of 20 mm.

Figure 10:
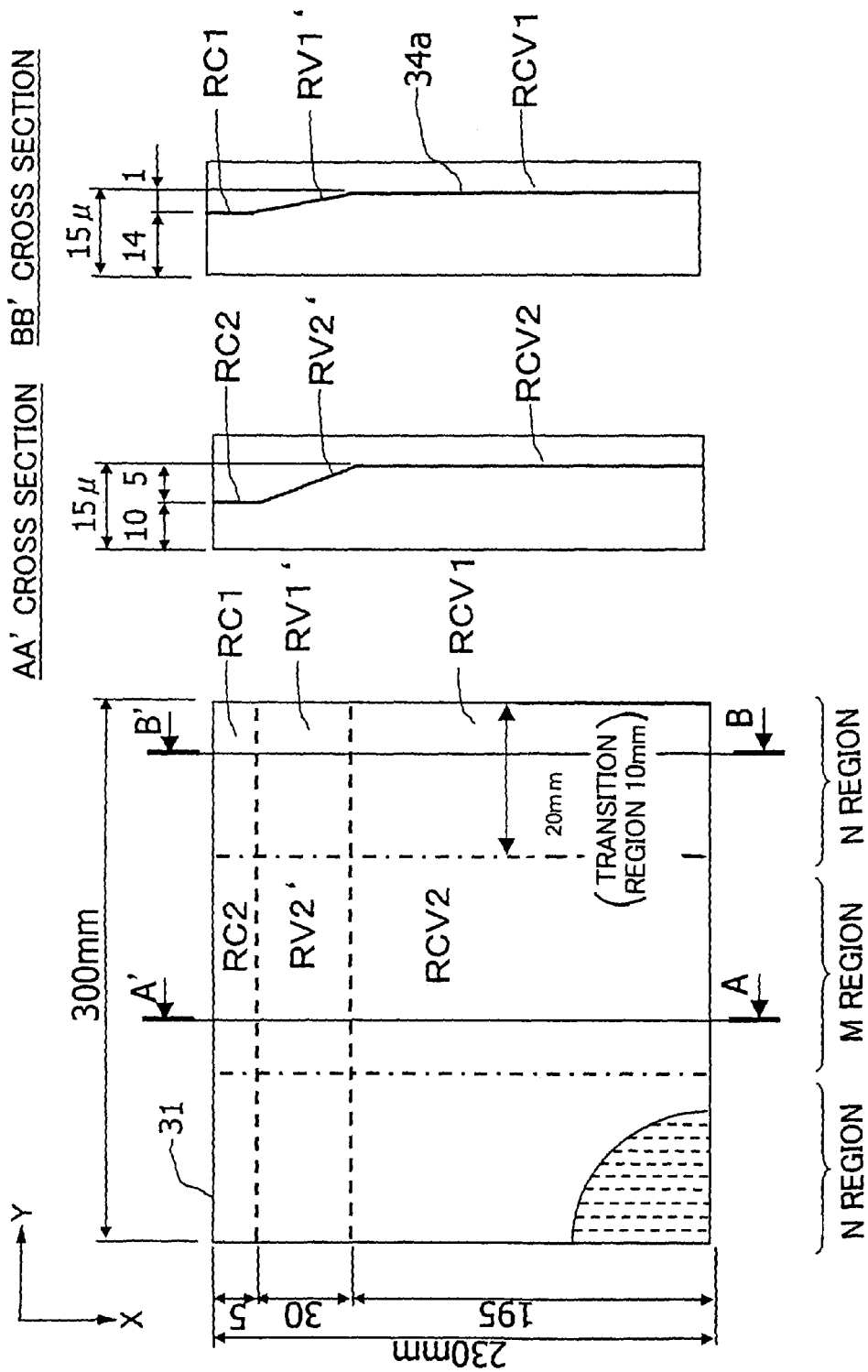
FIG. 10 shows a plan view of an embodiment of a light guide according to the present invention and A-A' and B-B' cross-sectional views of elongated prism portion thereof.
Figure 11:
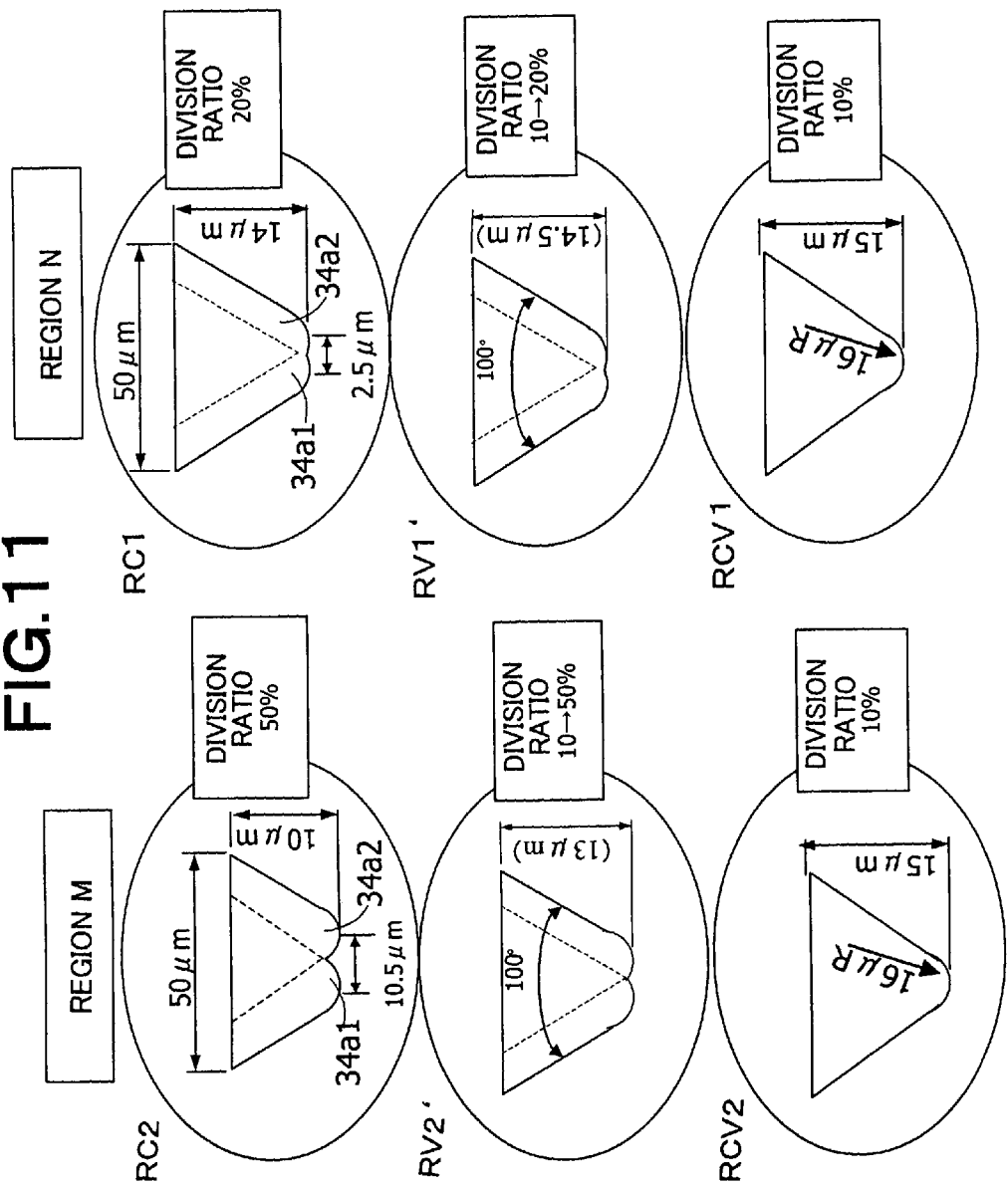
FIG. 11 shows a shape of a cross section of the elongated prism portion in each of the regions of the light guide of FIG. 10.

FIG. 10 shows a plan view of the light guide in further another embodiment of the surface light source device of the present invention, and an A-A' cross-sectional view and a B-B' cross-sectional view of the elongated prism thereof. In addition, FIG. 11 shows a cross-sectional profile of a part of the elongated prism in each of the regions.

In the present embodiment as well, a form of distribution of the division ratio with respect to the extending direction of the elongated prism is made different between a center region M and two regions N on both sides thereof with respect to the arrangement direction (Y direction) of the elongated prism on the rear surface of the light guide. A width (Y direction dimension) of the regions N is set to be 20 mm as shown in FIG. 10, for example. In the division ratio varying region RV2' belonging to the region M, the division ratio monotonously varies from 50% to 10%. In the division ratio varying region RV1' belonging to the region N, the division ratio monotonously varies from 20% to 10%. Then, in the region RC2 adjacent to the division ratio varying region RV2' in the region M, the division ratio is 50%. The region RC1 adjacent to the division ratio varying region RV1' in the region N, the division ratio is 20%. In addition, in both regions RCV1 and RCV2 adjacent to the division ratio varying regions RV1' and RV2', the division ratio is 10%.

In the present embodiment, with respect to the regions RC1 and RC2 close to the light incident end face, the division ratio of the region RC1 belonging to the region N is made smaller than the division ratio of the region RC2 belonging to the region M. Therefore, in addition to the effect similar to the embodiment in FIGS. 1 to 4 described above, a dark part generated in the vicinity of both corners on the light incident end face side of the light guide can be reduced, and reduction in brightness of the region N of both end parts of the light guide can be restricted intensively as compared with the region M of a center part of the light guide. In addition, an arc of the curvature radius R of 16 μm is adopted as a cross-sectional profile of the top portion of the elongated prism on the rear surface of the light guide. For this reason, as compared with the embodiment in FIGS. 1 to 4 described above, although the brightness of a front surface near the center was reduced, for example, by 2%, it was confirmed that an effect of reducing the emission line in the vicinity of the light incident end face be improved.

Figure 12:
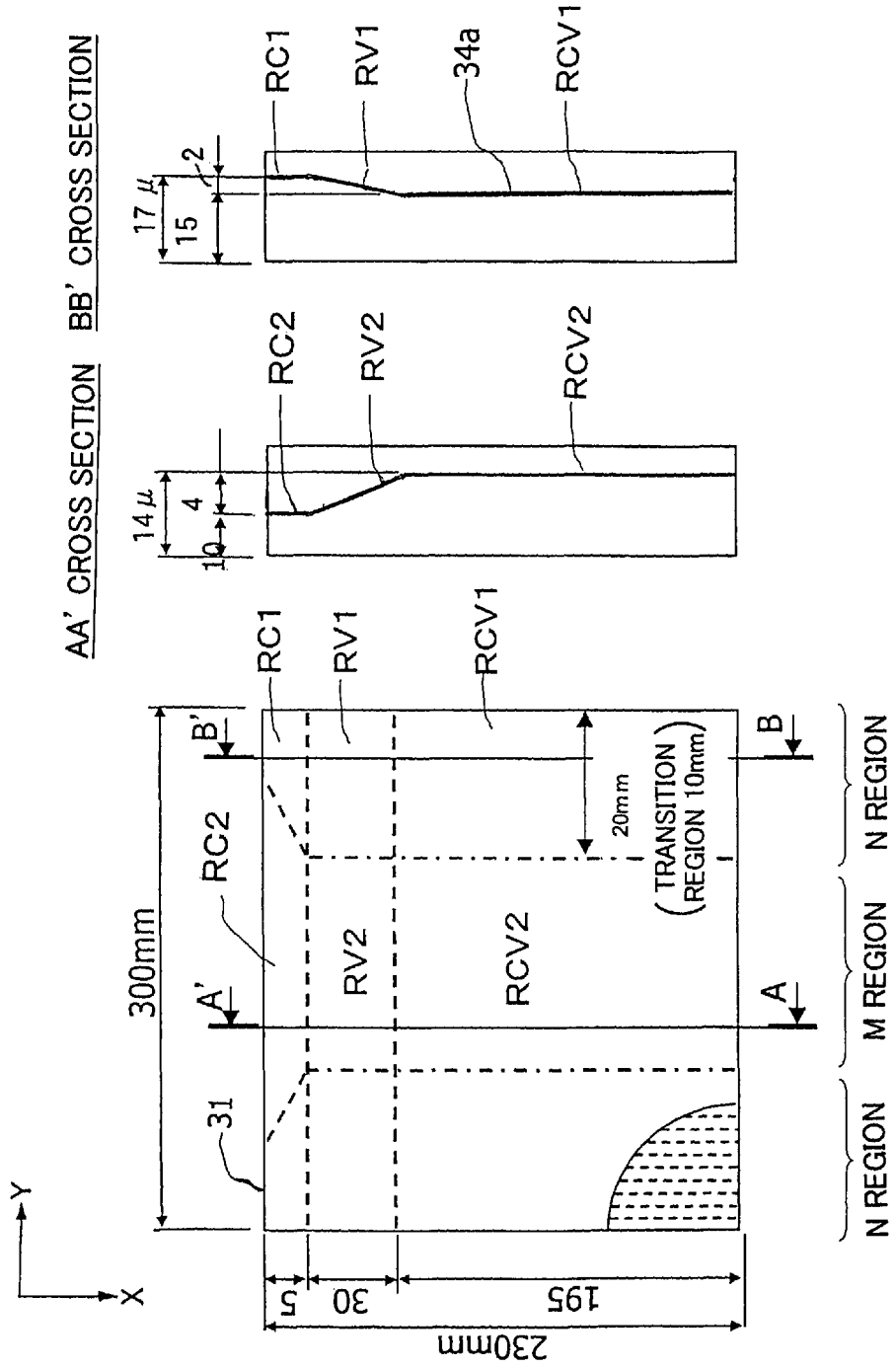
FIG. 12 shows a plan view of an embodiment of a light guide according to the present invention and A-A' and B-B' cross-sectional views of elongated prism portion thereof.
Figure 13:
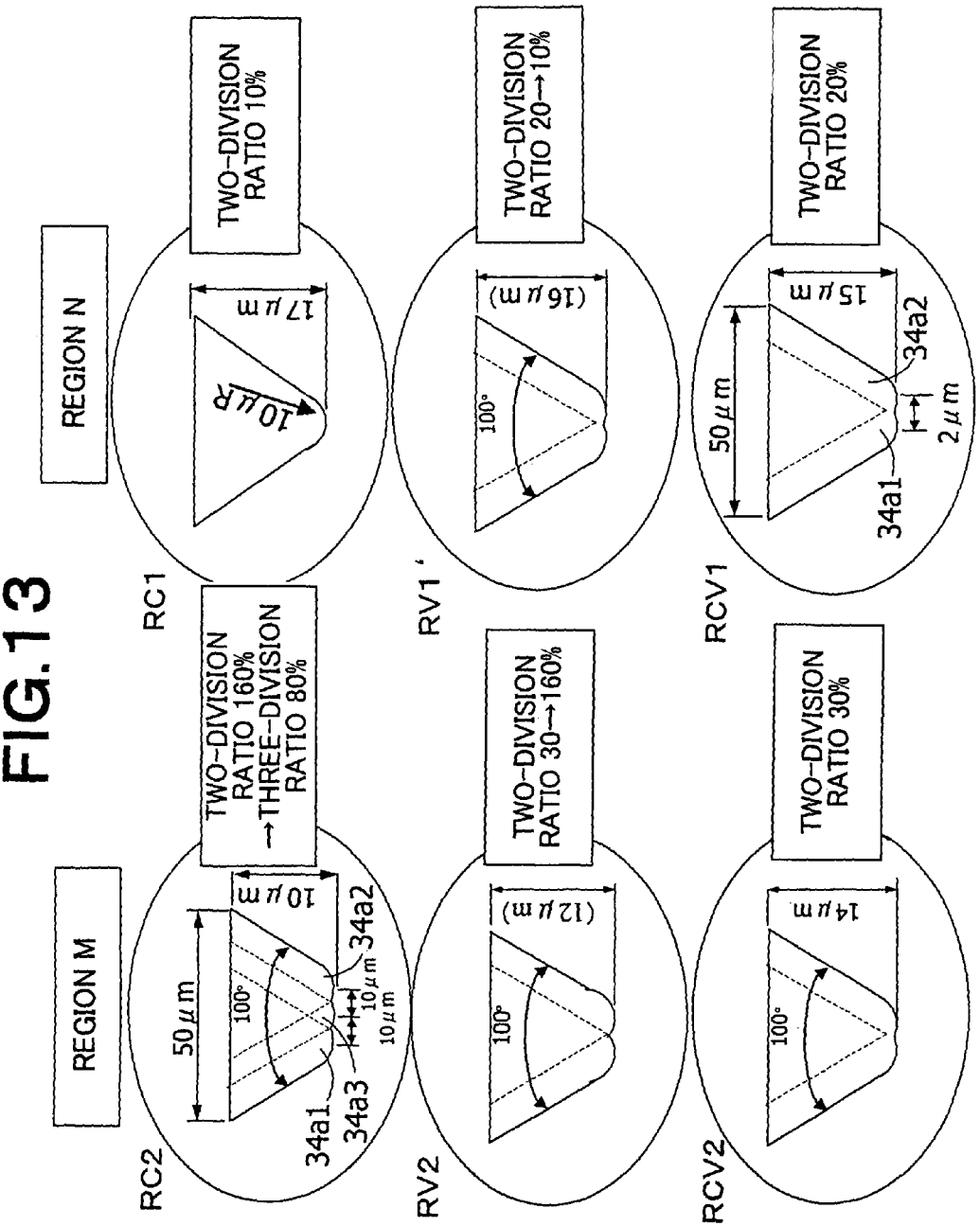
FIG. 13 shows a shape of a cross section of the elongated prism portion in each of the regions of the light guide of FIG. 12.

FIG. 12 shows a plan view of the light guide in further another embodiment of the surface light source device of the present invention, and an A-A' cross-sectional view and a B-B' cross-sectional view of the elongated prism thereof. FIG. 13 shows a cross-sectional profile of a part of the elongated prism in each region.

In the present embodiment as well, a form of distribution of the division ratio with respect to the extending direction of the elongated prism is made different between a center region M and two regions N on both sides thereof with respect to the arrangement direction (Y direction) of the elongated prism on the rear surface of the light guide. A width (Y direction dimension) of the regions N is set to be 20 mm as shown in FIG. 12, for example.

In the present embodiment, a boundary between the division ratio constant region RC2 belonging to the region M and the division ratio constant region RC1 belonging to the region N is inclined toward the extending-direction (Y direction) of the elongated prism. The boundary between the region M and the region N is made in a form deviating from a straight line as described above, and in this manner visibility of discontinuity of brightness in a boundary part can be further suppressed. In case of further reducing the visibility of the boundary, a region having small varying ratio of the division ratio (the regions RV2 and RV4 in FIG. 7) with respect to the extending direction of the elongated prism may further be provided between the regions RV1 and RV2 and the regions RCV1 and RCV2 as in the embodiment in FIGS. 7 to 9.

A function of the present embodiment as described above can be achieved in a similar manner in the embodiments in FIGS. 5 and 6, FIGS. 7 to 9, and FIGS. 10 and 11 described above.

In addition, in the present invention, in order to improve the uniformity of the entire brightness while improving an effect of the reduction of a dark part generated in the vicinity of both corners on the light incident end face, an angle (a prism apex angle) formed by both side surfaces of the elongated prism is set to be 100°, the curvature radius R of a cross-sectional arc shape of the top portion of the elongated prism is set to be 10 μm, and the region is divided into nine blocks and the division ratio appropriate for each of the blocks is adopted. In particular, in case the curvature radius R of the cross-sectional arc shape of the top portion of the prism line is set to be 10 μm, in order to further improve the reduction effect of the emission line in the vicinity of the light incident end face, the top portion of the elongated prism is divided into three portions to form three divided top portions 34a1, 34a2, and 34a3, in the region RC2 belonging to the center region M with respect to the arrangement direction of the elongated prism and positioned in the vicinity of the light incident end face. The division ratio (three-division ratio) in case of the division into three portions is set to be 80% (a division width of 10 μm). The division ratio (two-division ratio) in case that the center division top portion 34a3 is not formed is set to be 160% (a division width of 20 μm). Even in the vicinity of the light incident end face as the same condition, with respect to the regions N on both sides, the dark part generated in the vicinity of the both corners on the light incident end face is reduced while the emission line is reduced, and therefore the division ratio is set to be 10%.

In addition, as a countermeasure against the dark part generated in the vicinity of the both corner parts of the light incident end face side and the dark parts on both side where the both side parts of the light guide are darker as compared with the center part, the division ratio in the vicinity of the both side parts was set to be 10 to 20% which is the minimum, and the division ratio in the vicinity of the center part was set to be 30% or more to attempt improvement of the uniformity. As a result, an effect with respect to the dark part generated in the vicinity of the both corner parts of the light incident end face side and the both side dark parts was confirmed.

The division ratio constant region RC2 belonging to the region M in the present embodiment can also be set to a division ratio varying region. In this case, the division ratio is set to become gradually larger from a boundary part with the division ratio varying region RV2 to the light incident end face 31.

Figure 14:
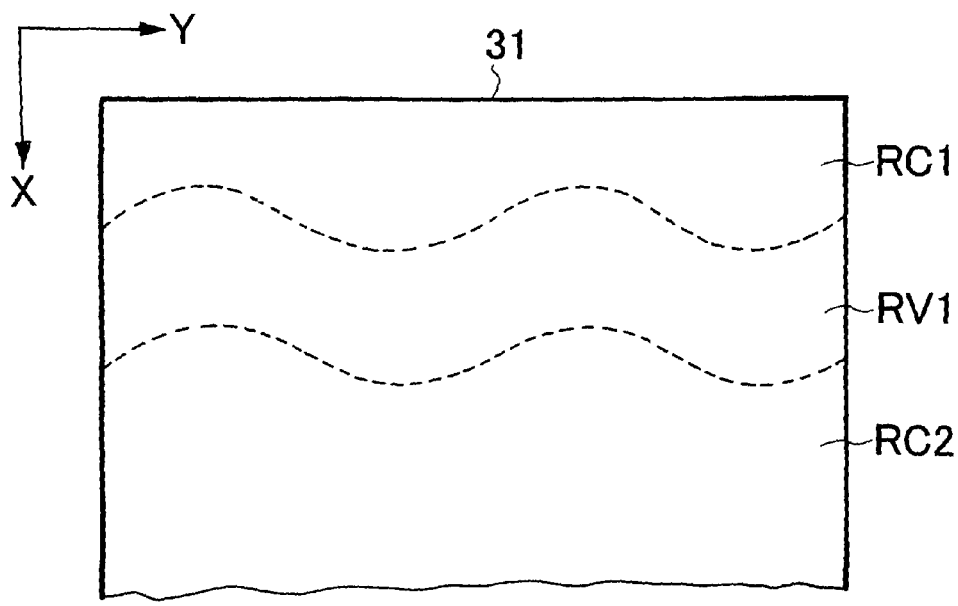
FIG. 14 shows a partial plan view of an embodiment of a light guide according to the present invention.
Figure 15:
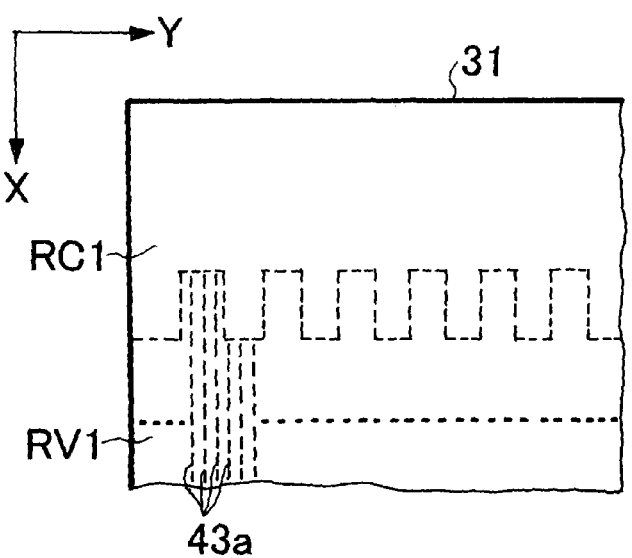
FIG. 15 shows a partial plan view of an embodiment of a light guide according to the present invention.

FIGS. 14 and 15 show modifications of the embodiment in FIGS. 1 to 4. In the modification of FIG. 14, a boundary between the division ratio varying region RV1 and the division ratio constant region RC1, and a boundary between the division ratio varying region RV1 and the division ratio constant region RC2 are varied continuously with respect to the arrangement direction (Y direction) of the elongated prism. A cycle of such varying is preferably set to be different with each other among four or more of the elongated prisms 34a positioned continuously with respect to the arrangement direction of the elongated prism, in view of suppressing the visibility of discontinuity of brightness at the boundary positions. In the modification of FIG. 15, a boundary is varied for each of the three elongated prisms 34a positioned continuously with respect to the arrangement direction of the elongated prisms.

In another embodiment of the present invention, the elongated prism 34a on the rear surface 34 of the light guide 3 has an arrangement pitch as described below.

Figure 16:
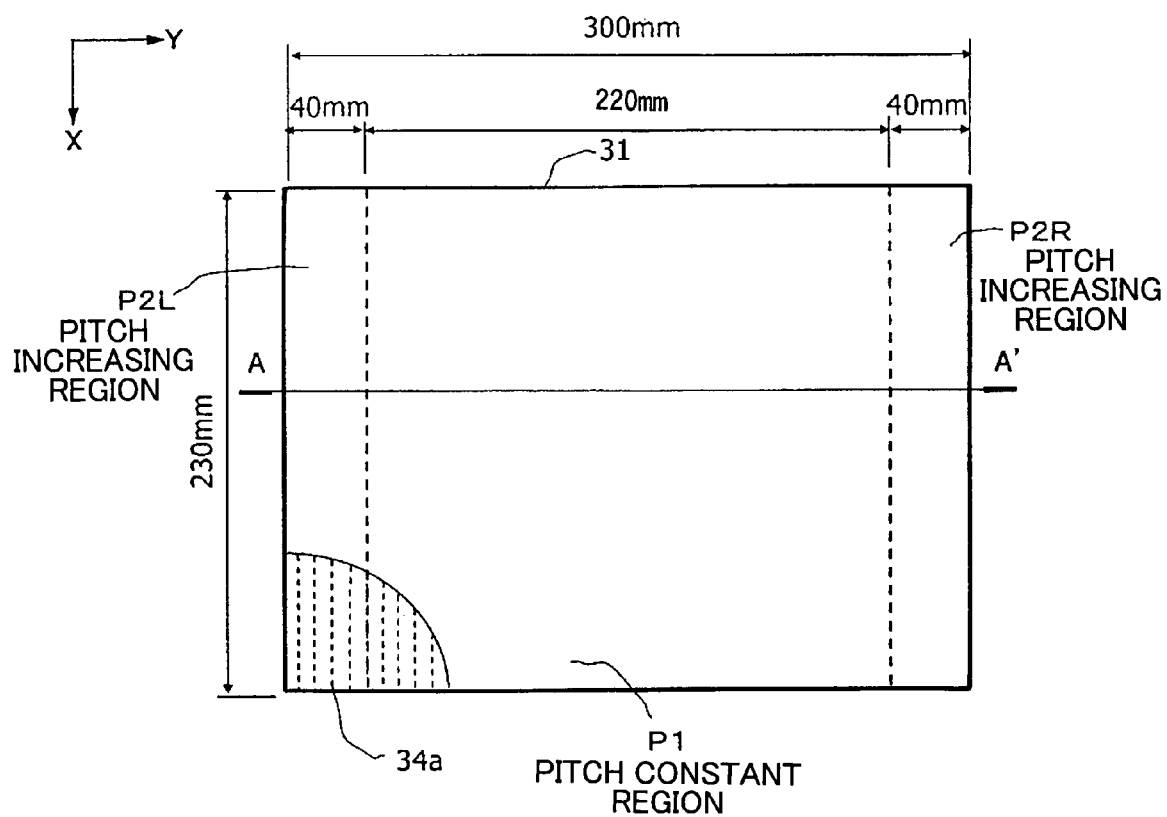
FIG. 16 shows a plan view of an embodiment of a light guide according to the present invention.

FIG. 16 shows a plan view of the light guide in another embodiment of the surface light source device of the present invention. FIG. 16 shows a state of the rear surface 34 seen through a light exit face side. The rear surface 34 has a region where a pitch varies on both end parts with respect to the arrangement direction of the elongated prism 34a, and has three regions classified by the pitch. That is, the rear surface 34 has a region P1 where there is no pitch variation in a center part with respect to the arrangement direction of the elongated prism 34a and regions P2L and P2R having pitch variation on both sides thereof.

Figure 17:
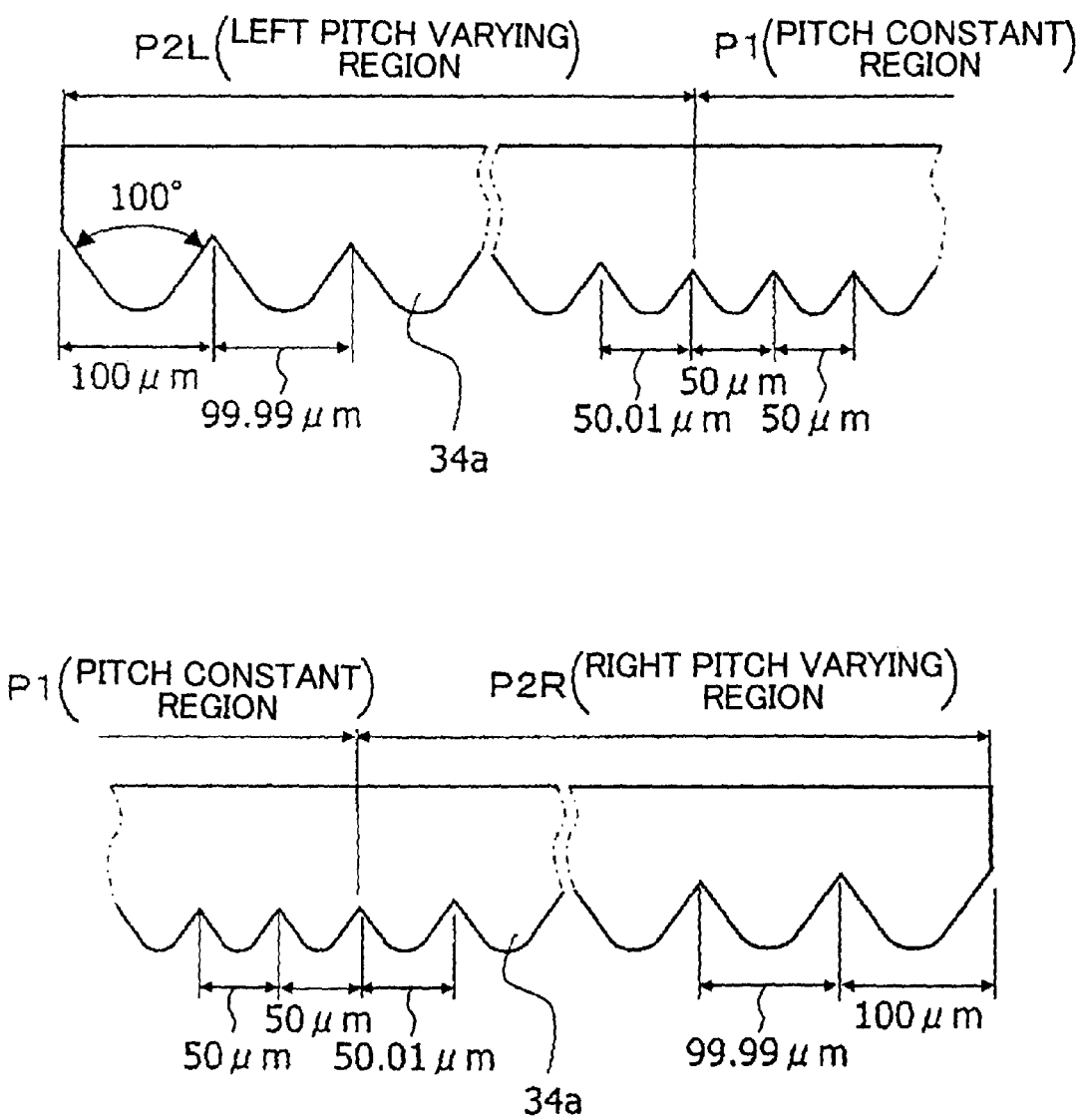
FIG. 17 shows a shape of a cross section of the elongated prism portion in each of the regions of the light guide of FIG. 16.

FIG. 17 shows a prism pitch in each of the regions P1, P2L and P2R, and variation thereof. In the pitch constant region P1 in the center part, the prism pitch is 50 µm and constant. In the right pitch varying region (pitch increasing region) P2R having a width of 40 mm, the prism pitch is 50.01 µm at a most inner side part (a part adjacent to the pitch constant region P1). The prism pitch increases as it moves in a rightward direction, and the prism pitch is 100 µm at the most outer side part. In a similar manner, in the left pitch varying region (pitch increasing region) P2L having a width of 40 mm, the prism pitch is 50.01 µm at the most inner side part (a part adjacent to the pitch constant region P1). The prism pitch increases as it moves in a leftward direction, and the prism pitch is 100 µm at the most outer side part.

Here, at a boundary between the region P1 where the pitch is constant and the region P2R or the region P2L where the pitch varies, switching of appearance occurs if rapid pitch variation occurs, and such switching is confirmed as a defect. For this reason, in the vicinity of a connection part between the region P2R or the region P2L and the region P1, a variation rate of the pitch is set to be small. In addition, by making an increasing rate of the pitch in a region in the vicinity of both ends of the rear surface 34 large, such parts are preferably prevented from generating a part which rapidly becomes dark so as to further favorably achieve an effect of brightness correction. In this manner, while visibility of discontinuity of brightness at the boundaries is reduced, brightness of the region which becomes dark in both end parts can be corrected.

FIGS. 16 and 17 show dimensions of each part in the light guide 3. Here, as the arrangement pitch of the elongated prism 34a, 50 µm for the pitch constant region P1 and 50.01 to 100 µm for the pitch varying regions P2R and P2L are exemplified. In the present invention, the arrangement pitch of the elongated prism 34a is set, for example, in a range of 5 to 200 µm, or preferably in a range of 10 to 100 µm, in the pitch constant region P1, and in a range of 5 to 300 µm, or preferably in a range of 10 to 150 µm in the pitch varying regions P2R and P2L. Here, the prism apex angle formed by two side surfaces of the elongated prism 34a set to be 100 degrees is exemplified. However, in the present invention, the prism apex angle may be set within a range of, for example, 80 to 150 degrees. This is because, by setting the prism apex angle within the above range, light emitted from the light guide 3 can be appropriately collected and brightness of the surface light source device can be improved. The above range is more preferably a range of 90 to 140 degrees.

Figure 18:
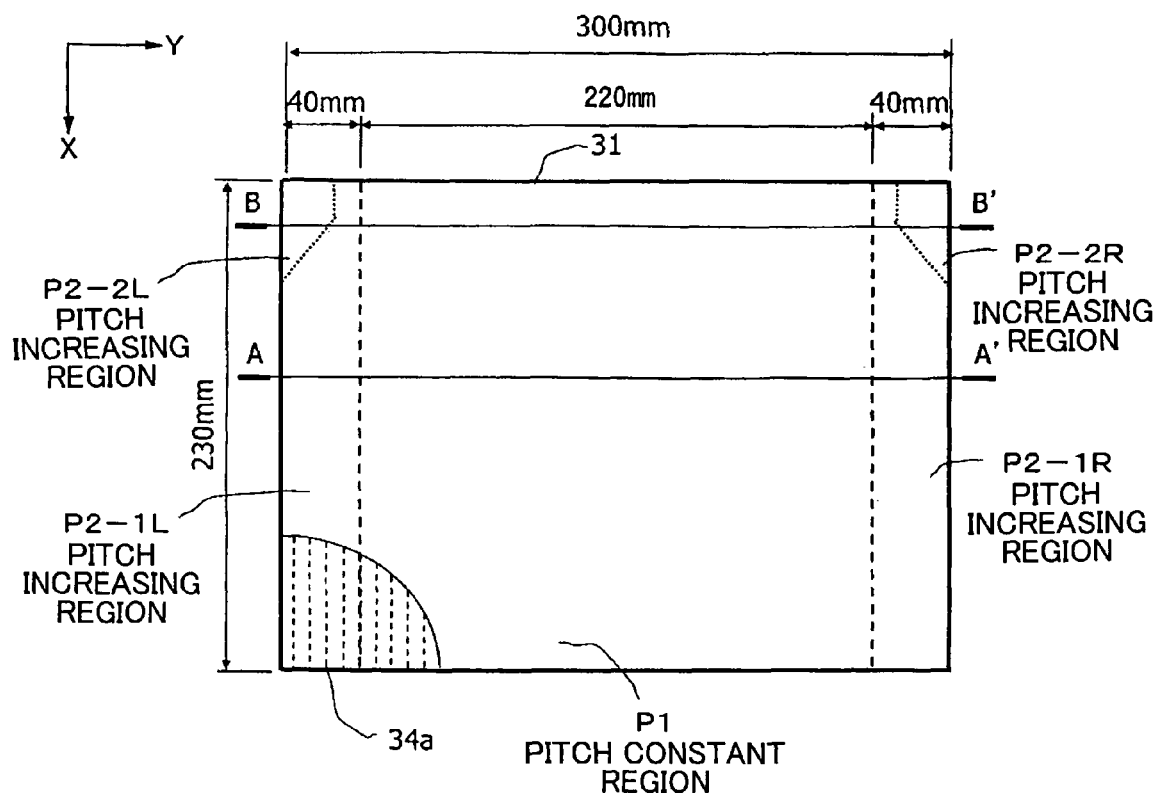
FIG. 18 shows a plan view of an embodiment of a light guide according to the present invention.

FIG. 18 shows a plan view of the light guide in another embodiment of the surface light source device of the present invention. FIG. 19 shows a B-B' cross-sectional profile of a part of the elongated prism in FIG. 18. In these figures, a member or a part identical to that in the embodiment in FIGS. 1 to 4 described above is attached to with the same numerical number.

In the present embodiment, the elongated prism 34a formed on the rear surface 34 of the light guide has the region P1 where the arrangement pitch is constant, P2-1R, P2-1L, P2-2R, and P2-2L where the arrangement pitch varies. Proportions of variation of the pitch are different between the regions P2-1R and P2-1L, and the regions P2-2R and P2-2L. By appropriately setting the proportion of variation of the pitch with respect to both the X direction and the Y direction, variation of a form of the internal reflection of light by the elongated prism 34a can be appropriately set with respect to each of the arrangement direction (Y direction) and the extending direction (X direction) of the elongated prism. In particular, in the regions P2-2R and P2-2L, by setting the variation rate of the pitch to be larger than that of the regions P2-1R and P2-1L, brightness unevenness by the dark part in the vicinity of the primary light source and in the corner regions at both ends of the light guide is not readily visually identified. However, the elongated lens needs to be continuous over the region P2-1R and the region P2-2R, therefore the elongated lens is arranged in a manner extending radially in the region P2-2R. Similarly, the elongated lens needs to be continuous over the region P2-1L and the region P2-2L, therefore the elongated lens is arranged in a manner extending radially in the region P2-2L. In these forms, forms where the elongated lens is arranged in a manner extending perpendicular to the light incident end face are different among the regions P1, P2-1R, and P2-1L. By these forms, an effect of the brightness correction increases at a region close to the corner parts, especially a region having large brightness spots, in the vicinity of the primary light source, in addition to the dark parts on both sides. Accordingly, an effect of improvement of the brightness uniformity is further increased.

Figure 20:
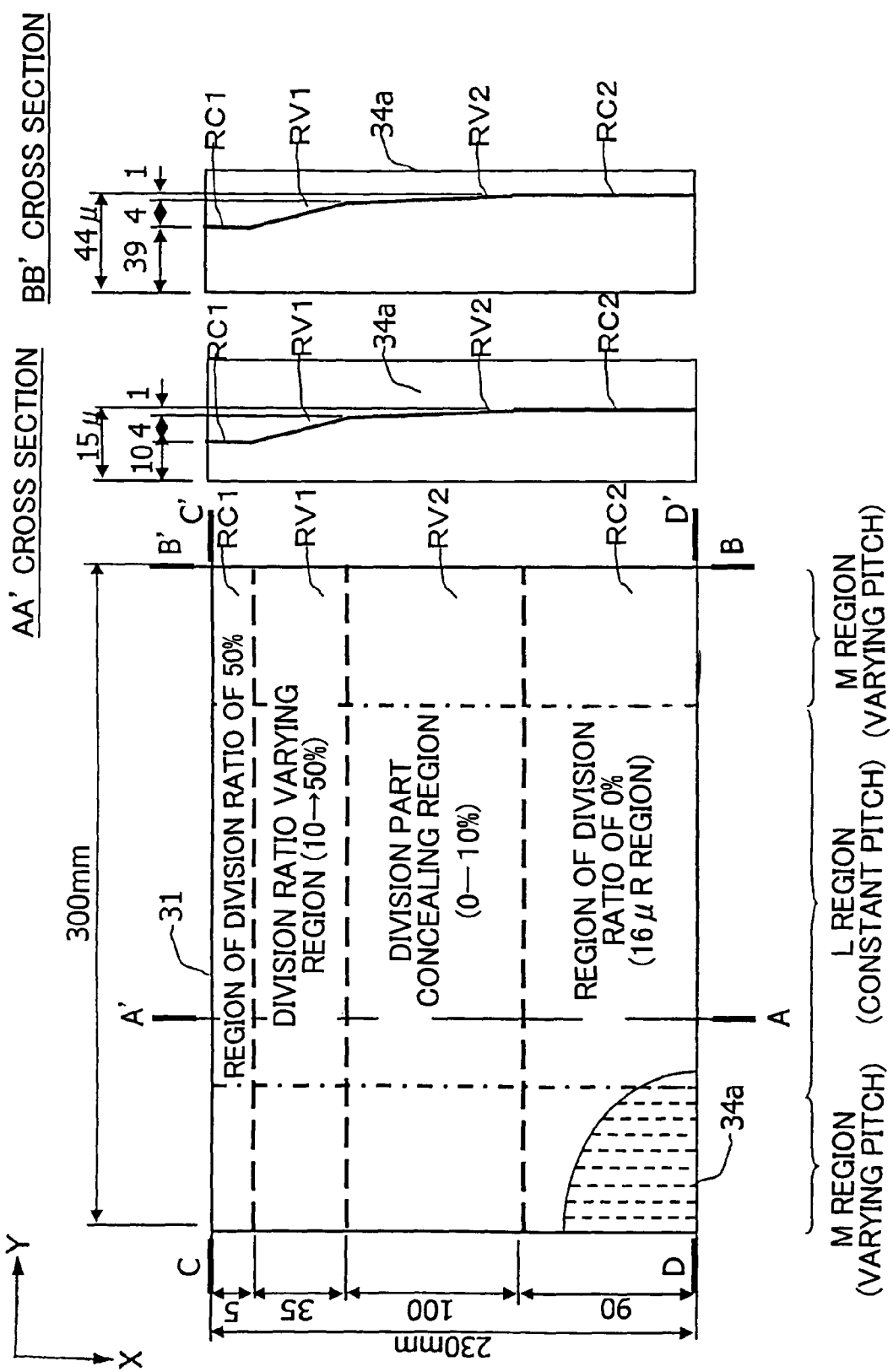
FIG. 20 shows a plan view of an embodiment of a light guide according to the present invention and A-A' and B-B' cross-sectional views of elongated prism portion thereof.
Figure 21:
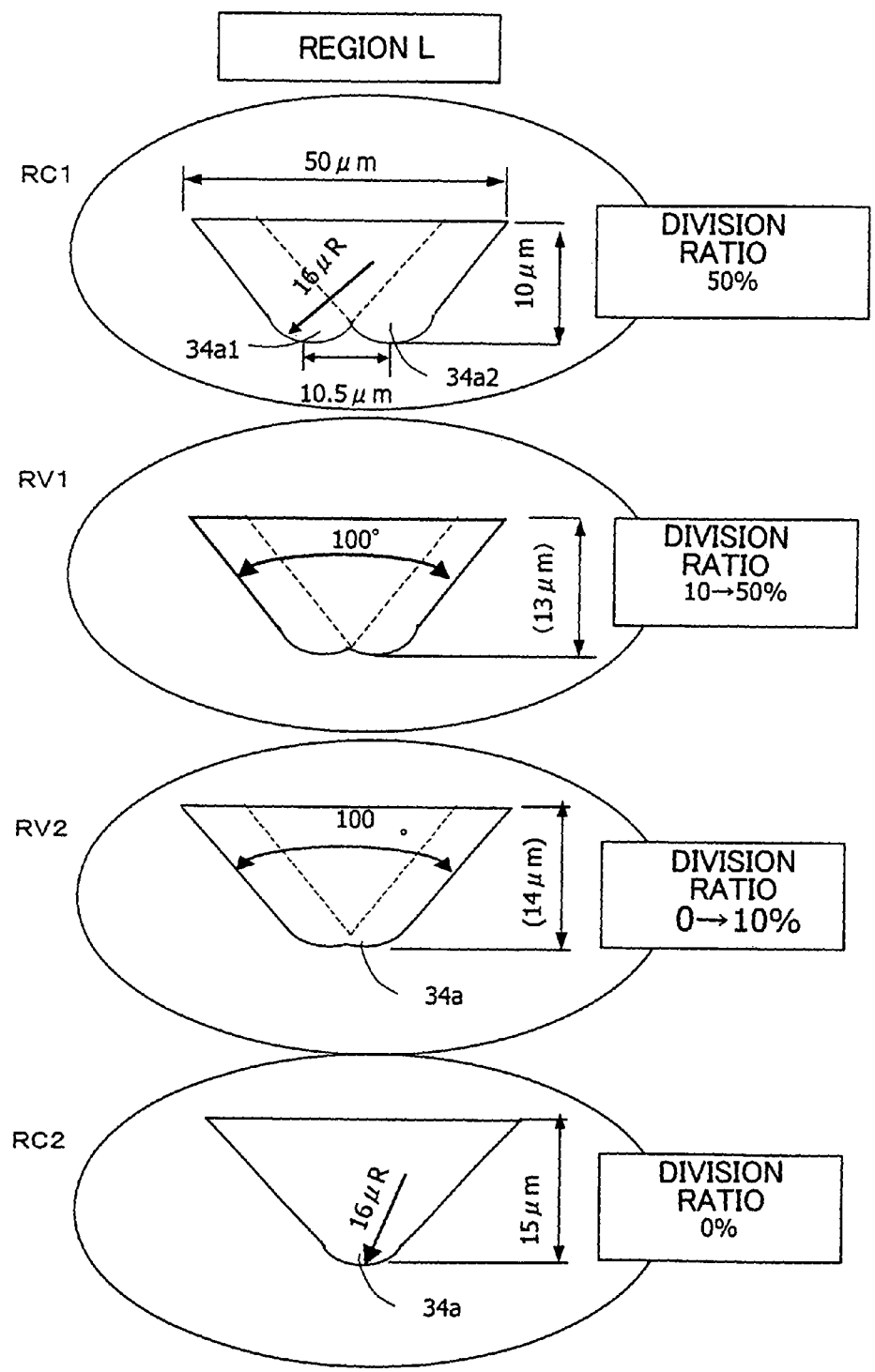
FIG. 21 shows a shape of a cross section of the elongated prism portion in each of the regions of the light guide of FIG. 20.
Figure 22:
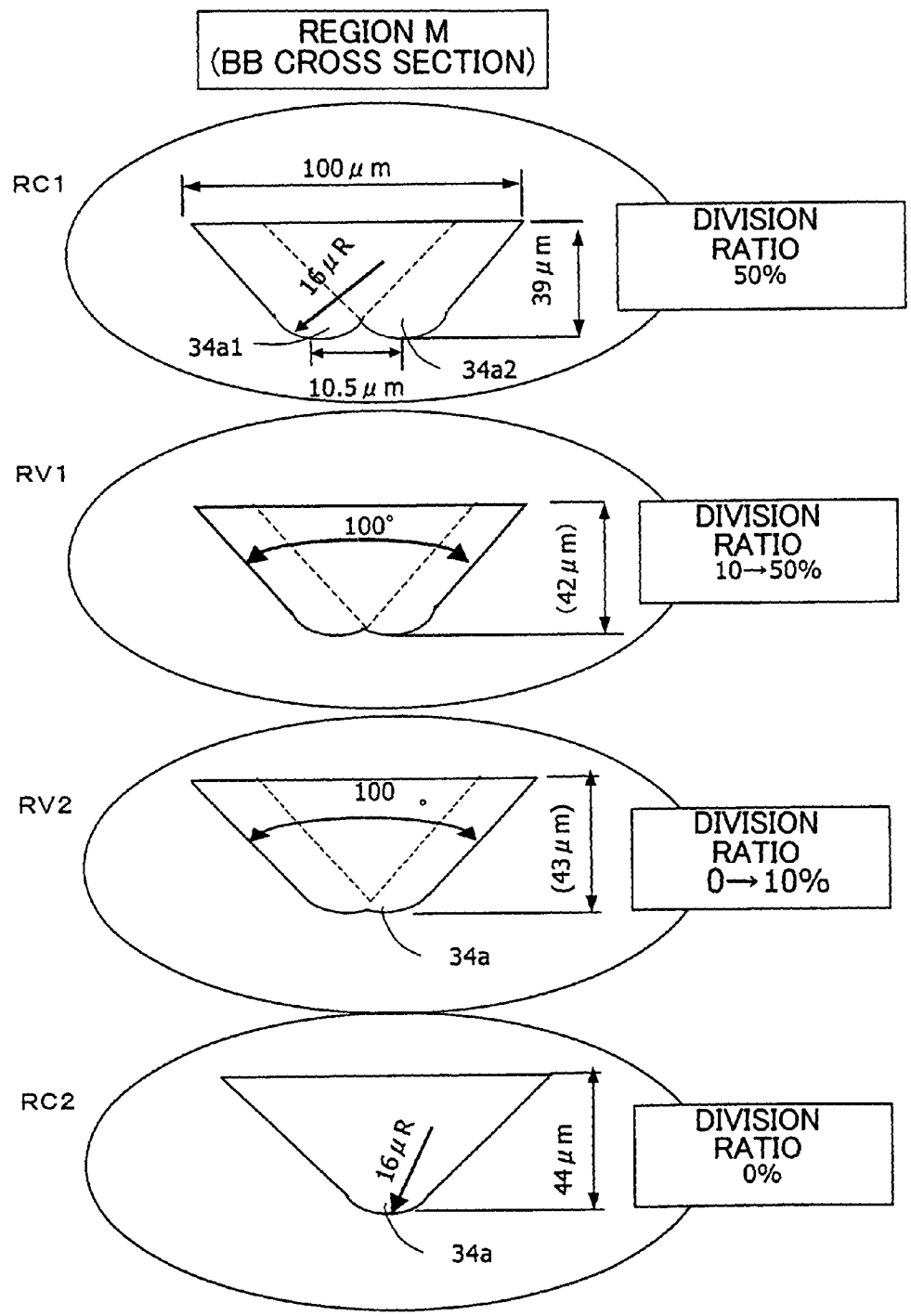
FIG. 22 shows a shape of a cross section of the elongated prism portion in each of the regions of the light guide of FIG. 20.

FIG. 20 shows a plan view of the light guide in another embodiment of the surface light source device of the present invention, and an A-A' cross-sectional view and a B-B' cross-sectional view of a part of the elongated prism thereof. FIG. 21 shows a cross-sectional profile of a part of the elongated prism of a region L in FIG. 20. FIG. 22 shows a cross-sectional profile (a cross-sectional profile at the B-B' position) of a part of the elongated prism of a region M in FIG. 20. FIG. 23 shows a shape of a C-C' cross section in FIG. 20, and FIG. 24 shows a shape of a D-D' cross section in FIG. 20.

In the present embodiment, the elongated prism 34a formed on the rear surface 34 of the light guide has the L region where the arrangement pitch is constant and the M region where the arrangement pitch varies. In addition, the elongated prism 34a formed on the rear surface 34 has the regions RC1 and RC2 where the division ratio of the top portion of the elongated prism is constant and the regions RV1 and RV2 where the division ratio of the top portion varies, with respect to the extending direction of the elongated prism.

Similar to the embodiment of FIGS. 16 and 17 described above, the L region where the arrangement pitch is constant has the arrangement pitch of 50 µm. In the M region where the arrangement pitch varies, the arrangement pitch varies from 50.01 µm to 100 µm for a width of 40 mm, and the brightness unevenness due to the dark part at both end parts is not readily visually identified.

Further, as specified in FIGS. 21 and 22, similar to the embodiment in FIGS. 1 to 4 described above, since the top portion of the elongated prism is divided especially for a width 5 mm+35 mm on a primary light source side, an effect of reducing the emission line in the vicinity of the light incident end face is obtained, and excellent external appearance can be obtained.

Figure 25:
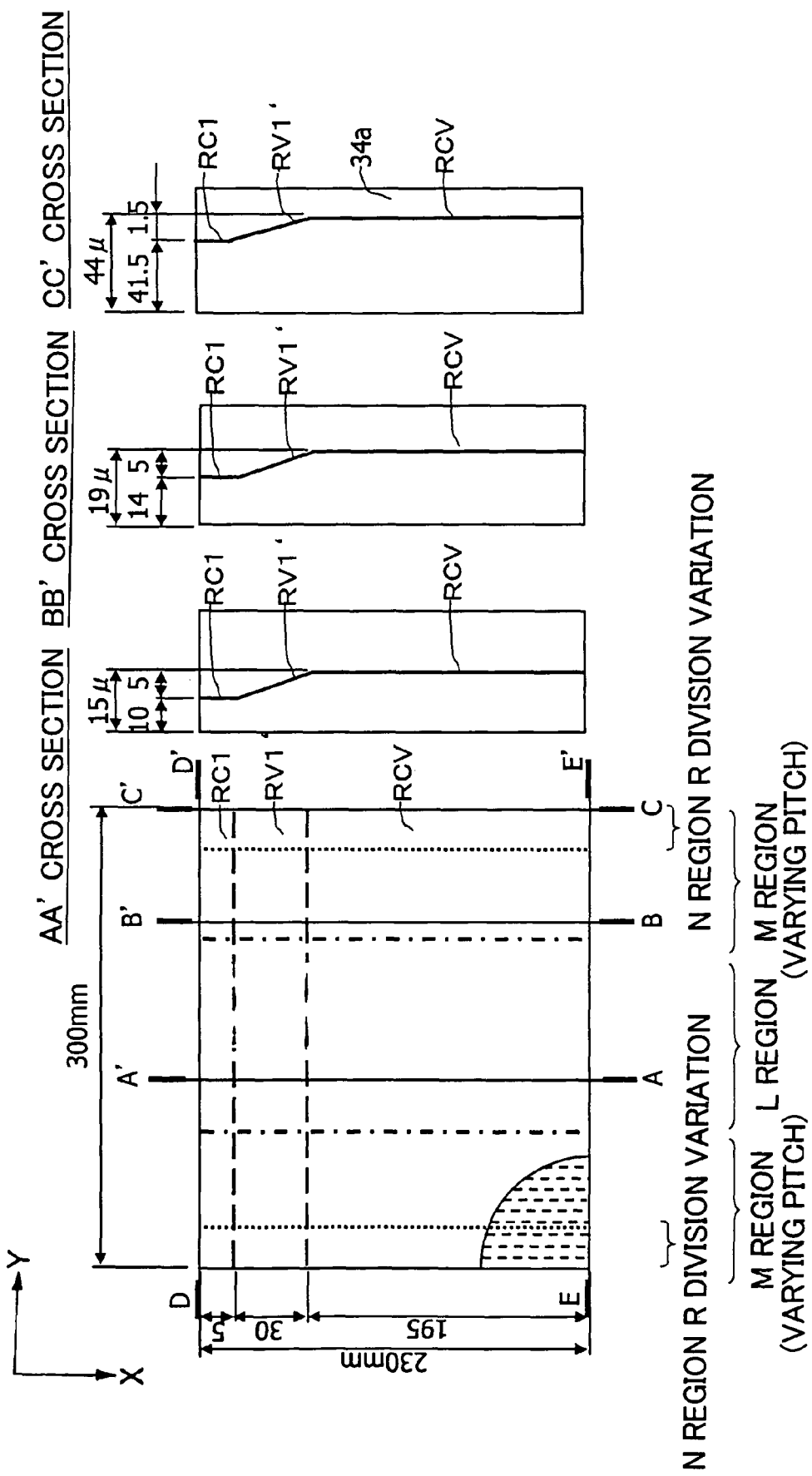
FIG. 25 shows a plan view of an embodiment of a light guide according to the present invention and A-A', B-B' and C-C' cross-sectional views of elongated prism portion thereof.
Figure 26:
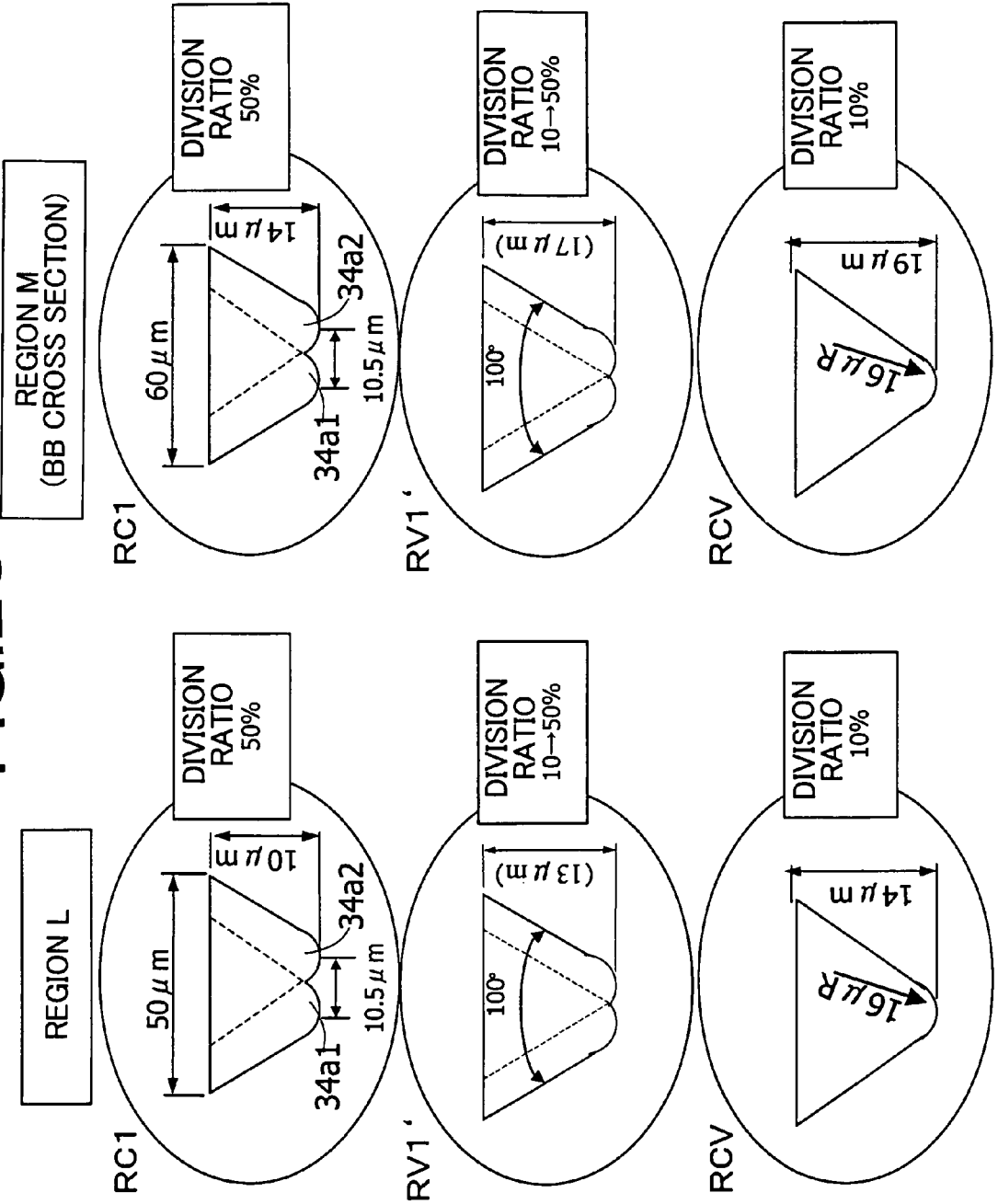
FIG. 26 shows a shape of a cross section of the elongated prism portion in each of the regions of the light guide of FIG. 25.
Figure 27:
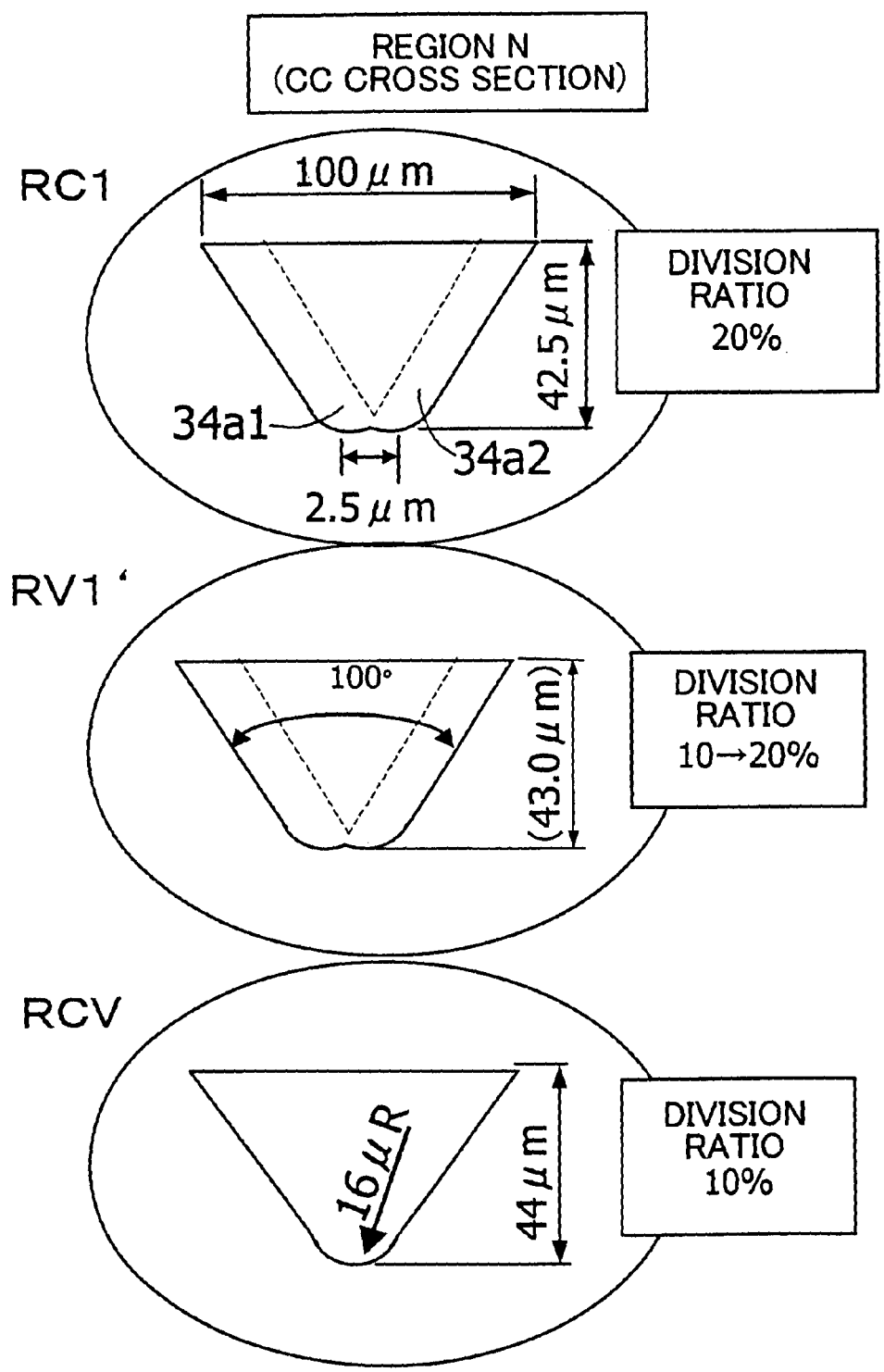
FIG. 27 shows a shape of a cross section of the elongated prism portion in each of the regions of the light guide of FIG. 25.
Figure 29:
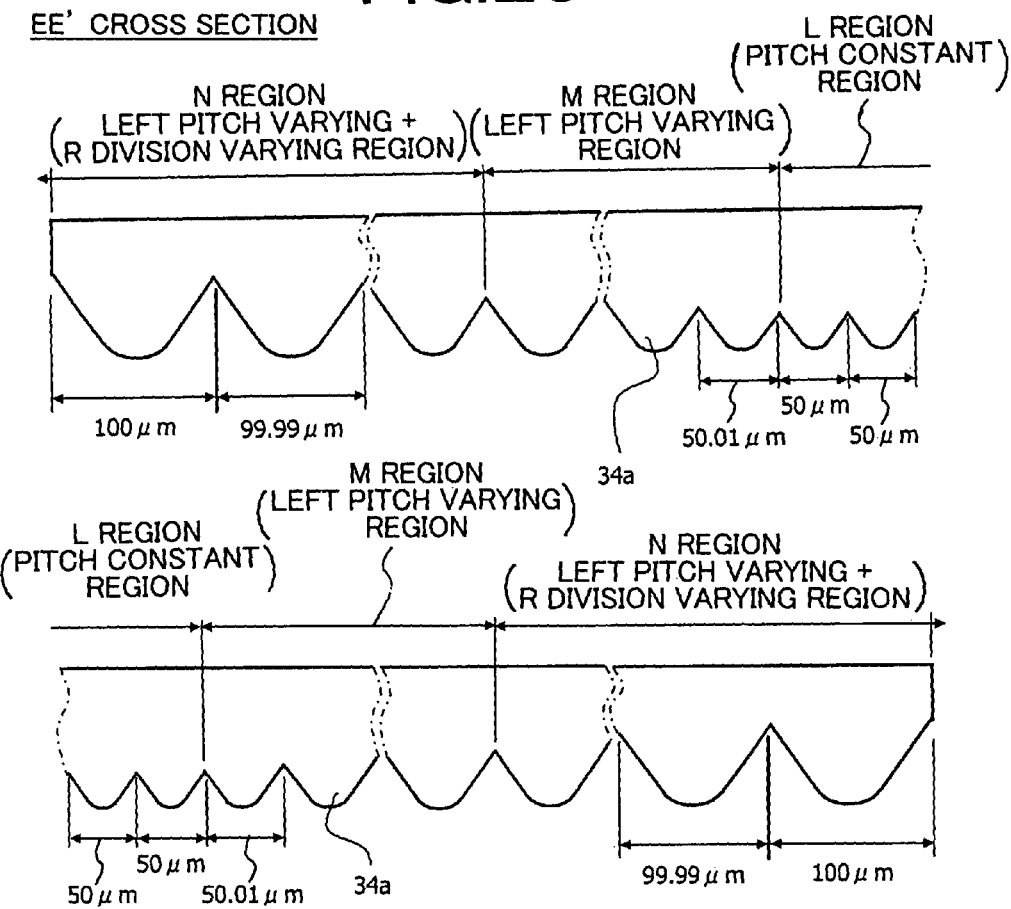
FIG. 29 shows a shape of a cross section of the elongated prism portion in each of the regions of the light guide of FIG. 25.

FIG. 25 shows a plan view of the light guide in another embodiment of the surface light source device of the present invention, and an A-A' cross-sectional view, a B-B' cross-sectional view, and a C-C' cross-sectional view of a part of the elongated prism thereof. FIG. 26 shows a cross-sectional profile of a part of the elongated prism of the region L and a cross-sectional profile (a cross-sectional profile in the B-B' position) of a part of the elongated prism of the region M in FIG. 25. FIG. 27 shows a cross-sectional profile (a cross-sectional profile in the C-C' position) of a part of the elongated prism of the region N in FIG. 25. FIG. 28 shows a shape of the D-D' cross section in FIG. 25 and FIG. 29 shows a shape of an E-E' cross section in FIG. 25.

In the present embodiment, similar to the embodiments of FIGS. 20 to 24, the L region where the pitch is constant and the M region where the pitch varies are formed. In particular, as shown in FIGS. 26 and 27, in addition to that the arrangement pitch of the elongated prism varies in the arrangement direction of the elongated prism, a region N (C-C' cross section) is formed as a region where the division ratio of the top portion of the elongated prism varies for a width of 10 mm.

In the present embodiment, as an effect of the N region where the division ratio decreases in the arrangement direction of the elongated prism, an effect of improving the dark part generated at both corner parts on the light incident end face of the light guide is achieved, and further improvement of external appearance is enabled.

Further, in the present invention, details will not be described other than the embodiments of FIGS. 20 to 24, and the embodiment of FIGS. 25 to 29. However, by combining the method which has been described by using FIGS. 3 to 15 and the method which has been described by using FIGS. 16 to 19, a greater effect can be obtained than when such methods are individually used.

What is claimed is:

1. A light guide for a surface light source device that is used for configuring the surface light source device in combination with a primary light source and guides light emitted from the primary light source, comprising:
    a light incident end face on which light emitted from the primary light source is incident, a light exit face from which guided light exits, and a rear surface on an opposite side of the light exit face; and
    a plurality of elongated prisms extending in a direction traversing the light incident end face formed on at least one of the light exit face and the rear surface,
    wherein each of the elongated prisms has a plurality of divided top portions where a top portion of each elongated prism is divided in a cross-sectional profile thereof in at least a part of a region with respect to an extending direction thereof.

2. The light guide for the surface light source device according to claim 1, wherein each of the divided top portions has a cross-sectional profile including a convex curved line.

3. The light guide for the surface light source device according to claim 1, wherein there exists a division ratio varying region where a division ratio indicating a degree of division of the top portion varies with respect to the extending direction.

4. The light guide for the surface light source device according to claim 3, wherein the division ratio monotonously varies continuously with respect to the extending direction in the division ratio varying region.

5. The light guide for the surface light source device according to claim 3, wherein a plurality of the division ratio varying regions are provided.

6. The light guide for the surface light source device according to claim 3, wherein the division ratio continues with respect to the extending direction.

7. The light guide for the surface light source device according to claim 3, wherein a position of a boundary between the division ratio varying region and a region where the division ratio is constant changes with respect to an arrangement direction of the elongated prisms so as not to be the same among four or more of the elongated prisms positioned continuously with respect to the arrangement direction of the elongated prisms.

8. The light guide for the surface light source device according to claim 3, wherein a center region and both side regions thereof with respect to the arrangement direction of the elongated prism on the light exit face or the rear surface having the elongated prism formed thereon have different forms of distribution of the division ratio with respect to the extending direction.

9. A light guide for a surface light source device that is used for configuring the surface light source device in combination with a primary light source and guides light emitted from the primary light source, comprising:
    a light incident end face on which light emitted from the primary light source is incident, a light exit face from which guided light exits, and a rear surface on an opposite side of the light exit face; and
    a plurality of elongated prisms extending in a direction traversing the light incident end face formed on at least one of the light exit face and the rear surface,
    wherein the elongated prisms have an arrangement pitch varying in at least a part of a region with respect to an arrangement direction thereof.

10. The light guide for the surface light source device according to claim 9, wherein a varying rate of the arrangement pitch varies in a region where the arrangement pitch of the elongated prism varies.

11. The light guide for the surface light source device according to claim 9, wherein the elongated prism has a varying rate of the arrangement pitch of the elongated prism different with respect to the extending direction thereof.

12. A surface light source device comprising:
    a light guide for the surface light source device as claimed in any one of claims 1-11;
    a primary light source arranged in a manner facing the light incident end face of the light guide; and
    a light deflection element arranged on the light exit face of the light guide.

13. The surface light source device according to claim 12, wherein the light deflection element comprises a plurality of elongated prisms extending along the light incident end face of the light guide and arranged in parallel with each other on a light incident surface positioned in a manner facing the light exit face of the light guide, and each of the elongated prisms thereof has a first prism surface on which light from the light exit face of the light guide is incident and a second prism surface on which the incident light is internally reflected.

* * * * *